(12) United States Patent
Lee et al.

(10) Patent No.: US 10,084,344 B2
(45) Date of Patent: Sep. 25, 2018

(54) METHOD FOR CONTROLLING WIRELESS POWER TRANSMITTER AND WIRELESS POWER RECEIVER

(71) Applicant: Samsung Electronics Co., Ltd., Gyeonggi-do (KR)

(72) Inventors: Kyung-Woo Lee, Seoul (KR); Kang-Ho Byun, Gyeonggi-do (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 128 days.

(21) Appl. No.: 14/608,990

(22) Filed: Jan. 29, 2015

(65) Prior Publication Data
US 2015/0214775 A1    Jul. 30, 2015

(30) Foreign Application Priority Data

Jan. 29, 2014 (KR) .......................... 10-2014-0011797

(51) Int. Cl.
| H02J 7/00 | (2006.01) |
| H02J 50/12 | (2016.01) |
| H02J 7/02 | (2016.01) |
| H04B 5/00 | (2006.01) |
| H02J 50/00 | (2016.01) |
| H02J 50/80 | (2016.01) |
| H02J 50/40 | (2016.01) |

(52) U.S. Cl.
CPC .............. *H02J 50/12* (2016.02); *H02J 7/025* (2013.01); *H02J 50/00* (2016.02); *H02J 50/40* (2016.02); *H02J 50/80* (2016.02); *H04B 5/0037* (2013.01); *H04B 5/0075* (2013.01)

(58) Field of Classification Search
CPC ....................................................... H02J 7/025
USPC ........................................................ 320/137
See application file for complete search history.

(56) References Cited

U.S. PATENT DOCUMENTS

| 9,660,478 | B2 * | 5/2017 | Von Novak ............. H02J 7/025 |
| 2011/0140538 | A1 | 6/2011 | Jung et al. |
| 2011/0204711 | A1 | 8/2011 | Norconk et al. |
| 2012/0139356 | A1 | 6/2012 | Jung et al. |
| 2012/0293007 | A1 | 11/2012 | Byun et al. |

(Continued)

FOREIGN PATENT DOCUMENTS

| CN | 103296784 | 9/2013 |
| KR | 10-2014-0031780 | 1/2013 |

(Continued)

OTHER PUBLICATIONS

International Search Report dated Apr. 24, 2015 issued in counterpart application No. PCT/KR2015/000919.

(Continued)

*Primary Examiner* — Suresh Memula
(74) *Attorney, Agent, or Firm* — The Farrell Law Firm, P.C.

(57) ABSTRACT

A control method of a wireless power transmitter for transmitting charging power to a wireless power receiver is provided. The control method includes receiving setting information from the wireless power receiver, determining a load variation of the wireless power receiver for a set time period, and determining that the wireless power receiver is a charging target, if the load variation of the wireless power matches the received setting information.

8 Claims, 16 Drawing Sheets

(56) References Cited

U.S. PATENT DOCUMENTS

| | | |
|---|---|---|
| 2013/0026981 A1 | 1/2013 | Van Der Lee |
| 2013/0181665 A1 | 7/2013 | Lee et al. |
| 2014/0062395 A1 | 3/2014 | Kwon et al. |
| 2014/0113689 A1* | 4/2014 | Lee .................. H01M 10/44 |
| | | 455/573 |
| 2014/0159653 A1* | 6/2014 | Von Novak .......... H04B 5/0031 |
| | | 320/108 |
| 2014/0368053 A1 | 12/2014 | Lee et al. |
| 2016/0336804 A1* | 11/2016 | Son .................. H02J 7/0027 |
| 2017/0256979 A1* | 9/2017 | Von Novak .......... H04B 5/0031 |

FOREIGN PATENT DOCUMENTS

| | | |
|---|---|---|
| WO | WO 2013/111917 | 8/2013 |
| WO | WO 2014/038862 | 3/2014 |

OTHER PUBLICATIONS

Chinese Office Action dated Feb. 14, 2018 issued in counterpart application No. 201580006518.9, 23 pages.
European Search Report dated Sep. 20, 2017 issued in counterpart application No. 15743606.4-1804, 11 pages.

* cited by examiner

METHOD FOR CONTROLLING WIRELESS POWER TRANSMITTER AND WIRELESS POWER RECEIVER

PRIORITY

This application priority under 35 U.S.C. § 119(a) to a Korean Patent Application filed on Jan. 29, 2014 in the Korean Intellectual Property Office and assigned Serial No. 10-2014-0011797, the entire contents of which are incorporated herein by reference.

BACKGROUND

1. Field of the Invention

The present invention relates generally to a method for controlling a wireless power transmitter and a wireless power receiver, and more particularly, to a method for controlling a wireless power transmitter and a wireless power receiver which communicate with each other in a predetermined communication scheme.

2. Description of the Related Art

In view of their nature, mobile terminals such as portable phones and Personal Digital Assistants (PDAs) are powered by rechargeable batteries. To charge the batteries, the mobile terminals apply electrical energy to the batteries via chargers. Typically, the charger and the battery each have an exterior contact terminal and thus are electrically connected to each other via their contact terminals.

This contact-based charging scheme faces the problem of vulnerability of contact terminals to contamination of foreign materials and the resulting unreliable battery charging because the contact terminals protrude outward. Moreover, if the contact terminals are exposed to moisture, the batteries may not charge properly.

To address the above problem, wireless charging or contactless charging technologies have recently been developed and applied to many electronic devices.

Such a wireless charging technology is based on wireless power transmission and reception. For example, once a portable phone is placed on a charging pad without being connected to an additional charging connector, its battery is automatically charged. Among wirelessly charged products, wireless electric toothbrushes and wireless electric shavers are well known. The wireless charging technology offers the benefits of increased waterproofness due to wireless charging of electronic products and enhanced portability due to no need for a wired charger for electronic devices. Further, it is expected that various relevant wireless charging technologies will be further developed in the upcoming era of electric vehicles.

There are mainly three wireless charging schemes: electromagnetic induction using coils, resonance-based charging, and Radio Frequency (RF)/microwave radiation based conversion of electrical energy to microwaves.

To date, the electromagnetic induction-based wireless charging scheme has been most popular. However, considering recent successful experiments in wireless power transmission over microwaves at a distance of tens of meters in Korea and other countries, it is foreseeable that every electronic product will be charged wirelessly at any time in any place in the near future.

Electromagnetic induction-based power transmission refers to power transfer between primary and secondary coils. When a magnet moves through a coil, current is induced in the coil. Based on this principle, a transmitter creates a magnetic field and a receiver produces energy by current induced by a change in the magnetic field. This phenomenon is called magnetic induction and power transmission based on magnetic induction is highly efficient for energy transfer.

In 2005, regarding resonance-based wireless charging, a system that makes wireless energy transfer from a charger at a distance of a few meters based on the resonance-based power transmission principle by the Coupled Mode Theory was developed. This wireless charging system is based on a physics concept that an oscillating tuning fork placed next to a wine glass will cause the wine glass to oscillate at the same frequency of the tuning fork. The team resonated electromagnetic waves carrying electric energy, instead of sound. The resonant electrical energy is directly transferred only in the presence of a device having the same resonant frequency, while the unused electric energy is reabsorbed into the electromagnetic field rather than being transmitted. Thus the resonant electrical energy does not affect nearby machines or human bodies, as compared to other electrical waves.

Wireless charging is a recent area of active research. However, there are no specified standards of wireless charging priority, detection of a wireless power transmitter/receiver, communication frequency selection between a wireless power transmitter and a wireless power receiver, wireless power control, selection of a matching circuit, and allocation of a communication time to each wireless power receiver in a single charging cycle. Particularly, there exists a need for developing standards for a configuration and procedures that allow a wireless power receiver to select a wireless power transmitter from which to receive wireless power.

A wireless power transmitter and a wireless power receiver may communicate with each other in a predetermined communication scheme, for example, by ZigBee or Bluetooth Low Energy (BLE). Such an out-of-band scheme such as ZigBee or BLE increases an available communication distance. Accordingly, even if a wireless power transmitter and a wireless power receiver are relatively far from each other, they may communicate. In other words, even if the wireless power transmitter is too far to transmit power wirelessly, the wireless power transmitter may communicate with the wireless power receiver.

Referring to FIG. 1, a first wireless power transmitter TX1 and a second wireless power transmitter TX2 are deployed. A first wireless power receiver RX1 is placed on the first wireless power transmitter TX1 and a second wireless power receiver RX2 is placed on the second wireless power transmitter TX2. The first wireless power transmitter TX1 should transmit power to the nearby first wireless power receiver RX1 and the second wireless power transmitter TX2 should transmit power to the nearby second wireless power receiver RX2. Accordingly, the first wireless power transmitter TX1 preferably communicates with the first wireless power receiver RX1 and the second wireless power transmitter TX2 preferably communicates with the second wireless power receiver RX2.

According to an increase in communication distance, the first wireless power receiver RX1 may join a wireless power network managed by the second wireless power transmitter TX2, while the second wireless power receiver RX2 may join a wireless power network managed by the first wireless power transmitter TX1. This is called cross-connection. As a result, the first wireless power transmitter TX1 may transmit power requested by the second wireless power receiver RX2 instead of the first wireless power receiver RX1. If the capacity of the second wireless power receiver RX2 is greater than the capacity of the first wireless power receiver RX1, the first wireless power receiver RX1 may experience overcharging. On the other hand, if the capacity of the second wireless power receiver RX2 is less than the capacity of the first wireless power receiver RX1, the first wireless power receiver RX1 receives power below its charging capacity (e.g. undercharging).

SUMMARY

The present invention has been made to address at least the above-mentioned problems and/or disadvantages and to provide at least the advantages described below. Accordingly, an aspect of the present invention is to provide a wireless power transmitter for determining a cross-connected wireless power receiver and a method for controlling the wireless power transmitter, in order to overcome a cross-connection problem.

In accordance with an aspect of the present invention, there is provided a control method of a wireless power transmitter for transmitting charging power to a wireless power receiver. The control method includes receiving setting information from the wireless power receiver, determining a load variation of the wireless power receiver for a set time period, and determining that the wireless power receiver is a charging target, if the load variation of the wireless power matches the received setting information.

In accordance with another aspect of the present invention, there is provided a control method of a wireless power transmitter for transmitting charging power to a wireless power receiver. The control method includes transmitting setting information to the wireless power receiver, determining a load variation of the wireless power receiver for a set time period, and determining that the wireless power receiver is a charging target, if the load variation of the wireless power matches the setting information.

In accordance with another aspect of the present invention, there is provided a control method of a wireless power transmitter for transmitting charging power to a wireless power receiver. The control method includes receiving time set information from the wireless power receiver; determining a load variation of the wireless power receiver for a set time period; and determining that the wireless power receiver is a charging target, if the load variation of the wireless power matches the received time set information.

In accordance with another aspect of the present invention, there is provided a control method of a wireless power receiver for receiving charging power from a wireless power transmitter. The control method includes transmitting setting information to the wireless power receiver, changing a load state according to a pattern included in the setting information for a set time period, receiving information indicating cross charging or non-cross charging from the wireless power transmitter, and terminating a connection to the wireless power transmitter, if cross charging is determined based on the received information indicating cross charging or non-cross charging.

In accordance with another aspect of the present invention, there is provided a control method of a wireless power receiver for receiving charging power from a wireless power transmitter. The control method includes receiving setting information from the wireless power receiver, changing a load state according to the setting information for a set time period, receiving information indicating cross charging or non-cross charging from the wireless power transmitter, and ending a connection to the wireless power transmitter, if cross charging is determined based on the received information indicating cross charging or non-cross charging.

In accordance with another aspect of the present invention, there is provided a control method of a wireless power receiver for receiving charging power from a wireless power transmitter. The control method includes transmitting time set information to the wireless power transmitter, changing a load state according to the time set information for a set time period, receiving information indicating cross charging or non-cross charging from the wireless power transmitter, and terminating a connection to the wireless power transmitter, if cross charging is determined based on the received information indicating cross charging or non-cross charging.

BRIEF DESCRIPTION OF THE DRAWINGS

The above and other aspects, features and advantages of the present invention will be more apparent from the following description, taken in conjunction with the accompanying drawings, in which.

DETAILED DESCRIPTION OF EMBODIMENTS OF THE PRESENT INVENTION

Figure 1:
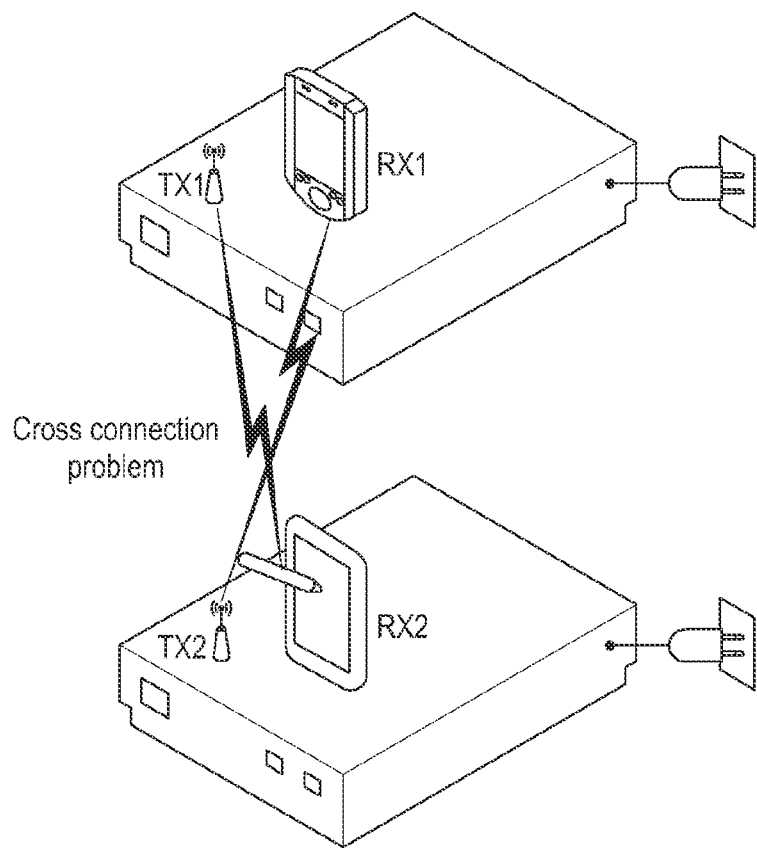
FIG. 1 is an illustration of a cross-connection.

The following description with reference to the accompanying drawings is provided to assist in a comprehensive understanding of embodiments of the present invention, as defined by the appended claims and their equivalents. It includes certain details to assist in that understanding, but these are to be regarded as merely exemplary. Accordingly, those of ordinary skilled in the art will recognize that various changes and modifications of the embodiments of the present invention described herein can be made without departing from the scope and spirit of the present invention. In addition, descriptions of well-known functions and constructions are omitted for clarity and conciseness. Throughout the drawings, like reference numerals will be understood to refer to like parts, components, and structures.

The terms used in the following description and claims are not limited to their dictionary meanings, but are merely used to enable a clear and consistent understanding of the present invention. Accordingly, it should be apparent to those skilled in the art that the following description of embodiments of the present invention is provided for illustration purposes only and not for the purpose of limiting the present invention, as defined by the appended claims and their equivalents.

It is to be understood that the singular forms "a," "an," and "the" include plural referents unless the context clearly dictates otherwise. Thus, for example, a reference to "a component surface" includes a reference to one or more of such surfaces.

The term "substantially" indicates that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic is intended to provide.

A description will first be provided of the concept of a wireless charging system applicable to embodiments of the present invention with reference to FIGS. 2 to 11, followed by a detailed description of methods for determining cross-charging according to various embodiments of the present invention with reference to FIGS. 12 to 17.

Figure 2:
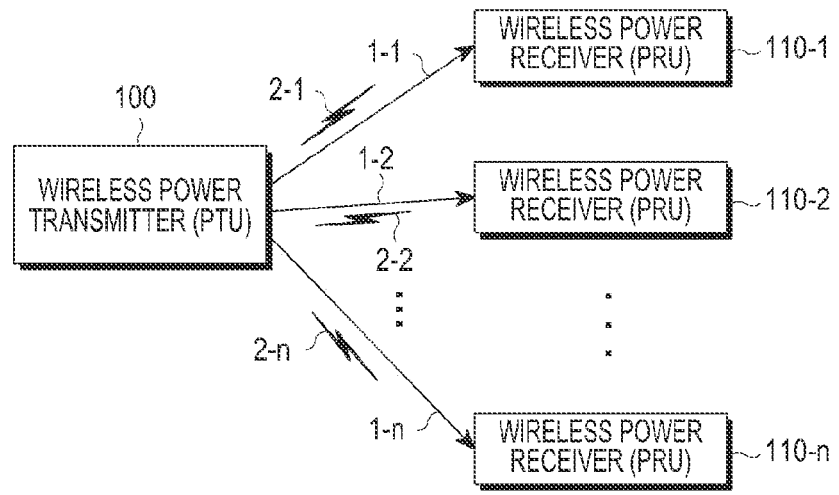
FIG. 2 is a block diagram illustrating an operation of a wireless charging system.

FIG. 2 is a block diagram illustrating an overall operation of a wireless charging system.

Referring to FIG. 2, the wireless charging system includes a wireless power transmitter (or Power Transmitting Unit (PTU)) 100 and one or more wireless power receivers (or Power Receiving Units (PRUs)) 110-1, 110-2, . . . , and 110-n.

The wireless power transmitter 100 wirelessly transmits power 1-1, 1-2, . . . , and 1-n, respectively, to the wireless power receivers 110-1, 110-2, . . . , and 110-n. More specifically, the wireless power transmitter 100 wirelessly transmits the power 1-1, 1-2, . . . , and 1-n only to wireless power receivers that have been authenticated in a predetermined authentication procedure.

The wireless power transmitter 100 establishes electrical connections to the wireless power receivers 110-1, 110-2, . . . , and 110-n. For example, the wireless power transmitter 100 transmits wireless power in the form of electromagnetic waves to the wireless power receivers 110-1, 110-2, . . . and 110-n.

The wireless power transmitter 100 conducts bi-directional communication with the wireless power receivers 110-1, 110-2, . . . and 110-n. The wireless power transmitter 100 and the wireless power receivers 110-1, 110-2, . . . , and 110-n processes or transmits/receives packets 2-1, 2-2, . . . , and 2-n configured in predetermined frames. The frames are described later in greater detail. A wireless power receiver may be configured as a mobile communication terminal, a Personal Digital Assistant (PDA), a Personal Multimedia Player (PMP), a smartphone, or the like.

The wireless power transmitter 100 applies power wirelessly to the plurality of wireless power receivers 110-1, 110-2, . . . , and 110-n. For example, the wireless power transmitter 100 transmits power to the plurality of wireless power receivers 110-1, 110-2, . . . , and 110-n by resonance. If the wireless power transmitter 100 adopts the resonance scheme, the distance between the wireless power transmitter 100 and the wireless power receivers 110-1, 110-2, . . . , and 110-n may be preferably 30 m or less. If the wireless power transmitter 100 adopts an electromagnetic induction scheme, the distance between the wireless power transmitter 100 and the wireless power receivers 110-1, 110-2, . . . , and 110-n may be preferably 10 cm or less.

The wireless power receivers 110-1, 110-2, . . . , and 110-n receives wireless power from the wireless power transmitter 100 and charge their internal batteries. Further, the wireless power receivers 110-1, 110-2, . . . , and 110-n transmits to the wireless power transmitter 100 a signal requesting wireless power transmission, information required for wireless power reception, wireless power receiver state information, or control information for the wireless power transmitter 100. Information of the transmitted signal is described below in greater detail.

Each of the wireless power receivers 110-1, 110-2, . . . , and 110-n transmits a message indicating its charged state to the wireless power transmitter 100.

The wireless power transmitter 100 includes a display means such as a display and displays the state of each wireless power receiver based on the messages received from the wireless power receivers 110-1, 110-2, . . . , and 110-n. Further, the wireless power transmitter 100 displays a time expected until each of the wireless power receivers 110-1, 110-2, . . . , and 110-n is completely charged.

The wireless power transmitter 100 transmits a control signal for disabling a wireless charging function to the wireless power receivers 110-1, 110-2, . . . , and 110-n. Upon receipt of the control signal for disabling the wireless charging function from the wireless power transmitter 100, a wireless power receiver disables the wireless charging function.

Figure 3A:
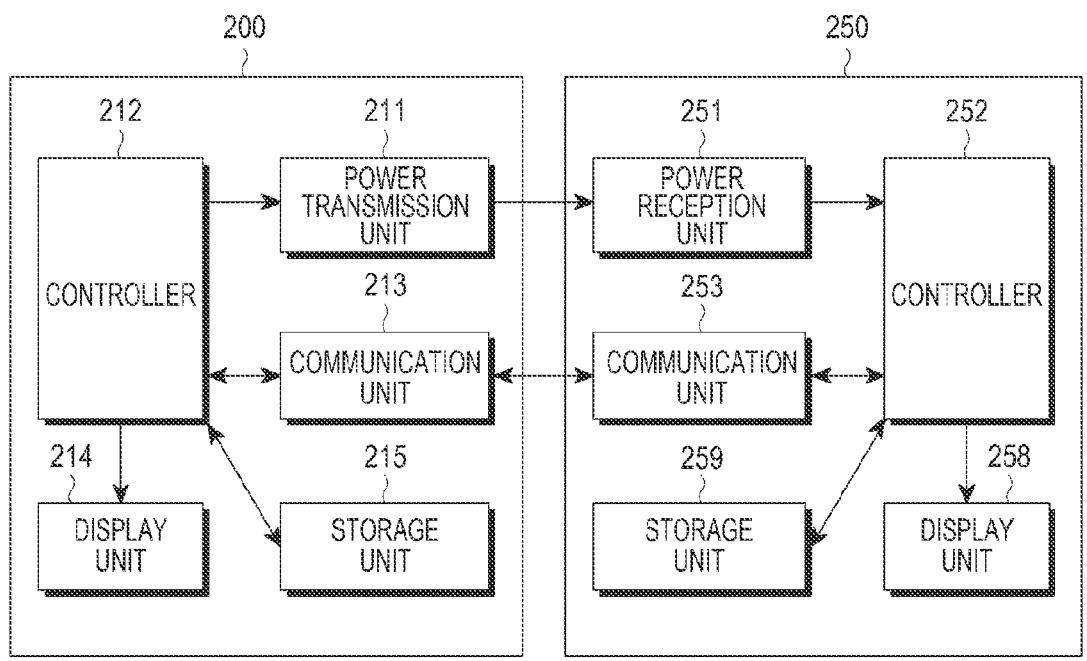
FIG. 3A is a block diagram illustrating a wireless power transmitter and a wireless power receiver according to an embodiment of the present invention.

FIG. 3A is a block diagram illustrating a wireless power transmitter and a wireless power receiver according to an embodiment of the present invention.

Referring to FIG. 3A, a wireless power transmitter 200 includes at least one of a power transmission unit 211, a controller 212, a communication unit 213, a display unit 214, and a storage unit 215.

The power transmission unit 211 supplies power required for the wireless power transmitter 200 and wirelessly supplies power to a wireless power receiver 250. The power transmission unit 211 supplies power in the forge of Alternate Current (AC) waveforms or by converting power in Direct Current (DC) waveforms to power in AC waveforms by means of an inverter. The power transmission unit 211 may be implemented as a built-in battery. Alternatively, the power transmission unit 211 may be implemented as a power reception interface so as to receive power externally and supply the power to other components. It will be understood to those skilled in the art that any means that can supply power in AC waveforms may be used as the power transmission unit 211.

The controller 212 provides overall control to the wireless power transmitter 200. The controller 212 controls an overall operation of the wireless power transmitter 200 using an algorithm, a program, or an application required for a control operation, read from the storage unit 215. The controller 212 may be configured as a Central Processing Unit (CPU), a microprocessor, or a mini computer.

The communication unit 213 communicates with the wireless power receiver 250 in a predetermined communication scheme. The communication unit 213 receives power information from the wireless power receiver 250. The power information includes information about at least one of the capacity, residual battery amount, usage, battery capacity, and battery proportion of the wireless power receiver 250.

Further, the communication unit 213 transmits a charging function control signal for controlling the charging function of the wireless power receiver 250. The charging function control signal is a control signal that enables or disables the charging function by controlling a power reception unit 251 of the wireless power receiver 250. Alternatively, the power information may include information about insertion of a wired charging terminal, transition from a Stand Alone (SA) mode to a Non-Stand Alone (NSA) mode, error state release, and the like, as described below in greater detail. The charging function control signal may be information related to a determination as to a cross connection according to embodiments of the present invention. For example, the charging function control signal may include IDentification (ID) information for determining cross connection, setting information, and pattern or time information related to a load variation of the wireless power receiver 250, for a cross-connection determination.

The communication unit 213 can receive a signal from another wireless power transmitter as well as the wireless power receiver 250.

The controller 212 displays a state of the wireless power receiver 250 on the display unit 214 based on a message received from the wireless power receiver 250 via the communication unit 213. Further, the controller 212 displays a time expected until the wireless power receiver 250 is completely charged on the display unit 214.

As illustrated in FIG. 3A, the wireless power receiver 250 includes at least one of a power reception unit 251, a controller 252, a communication unit 253, a display unit 258, and a storage unit 259.

The power reception unit 251 receives power wirelessly from the wireless power transmitter 200. The power reception unit 251 receives power in the form of AC waveforms from the wireless power transmitter 200.

The controller 252 provides overall control to the wireless power receiver 250. The controller 252 controls an overall operation of the wireless power receiver 250 using an algorithm, a program, or an application required for a control operation, read from the storage unit 259. The controller 252 may be configured as a CPU, a microprocessor, or a mini computer.

The communication unit 253 communicates with the wireless power transmitter 200 in a predetermined communication scheme. The communication unit 253 transmits power information to the wireless power transmitter 200. The power information includes information about at least one of the capacity, residual battery amount, usage, battery capacity, and battery proportion of the wireless power receiver 250.

Further, the communication unit 253 transmits a charging function control signal for controlling the charging function of the wireless power receiver 250. The charging function control signal is a control signal that enables or disables the charging function by controlling the power reception unit 251 of the specific wireless power receiver 250. Alternatively, the power information may include information about insertion of a wired charging terminal, transition from the SA mode to the NSA mode, error state release, and the like, as described below in greater detail. The charging function control signal is information related to a determination as to a cross connection according to embodiments of the present invention. For example, the charging function control signal may include an identification (ID) information for determining cross-connection, setting information, and pattern or time information related to a load variation of the wireless power receiver 250, for cross connection determination.

The controller 252 displays a state of the wireless power receiver 250 on the display unit 258. Further, the controller 252 displays a time expected until the wireless power receiver 250 is completely charged on the display unit 258.

Figure 3B:
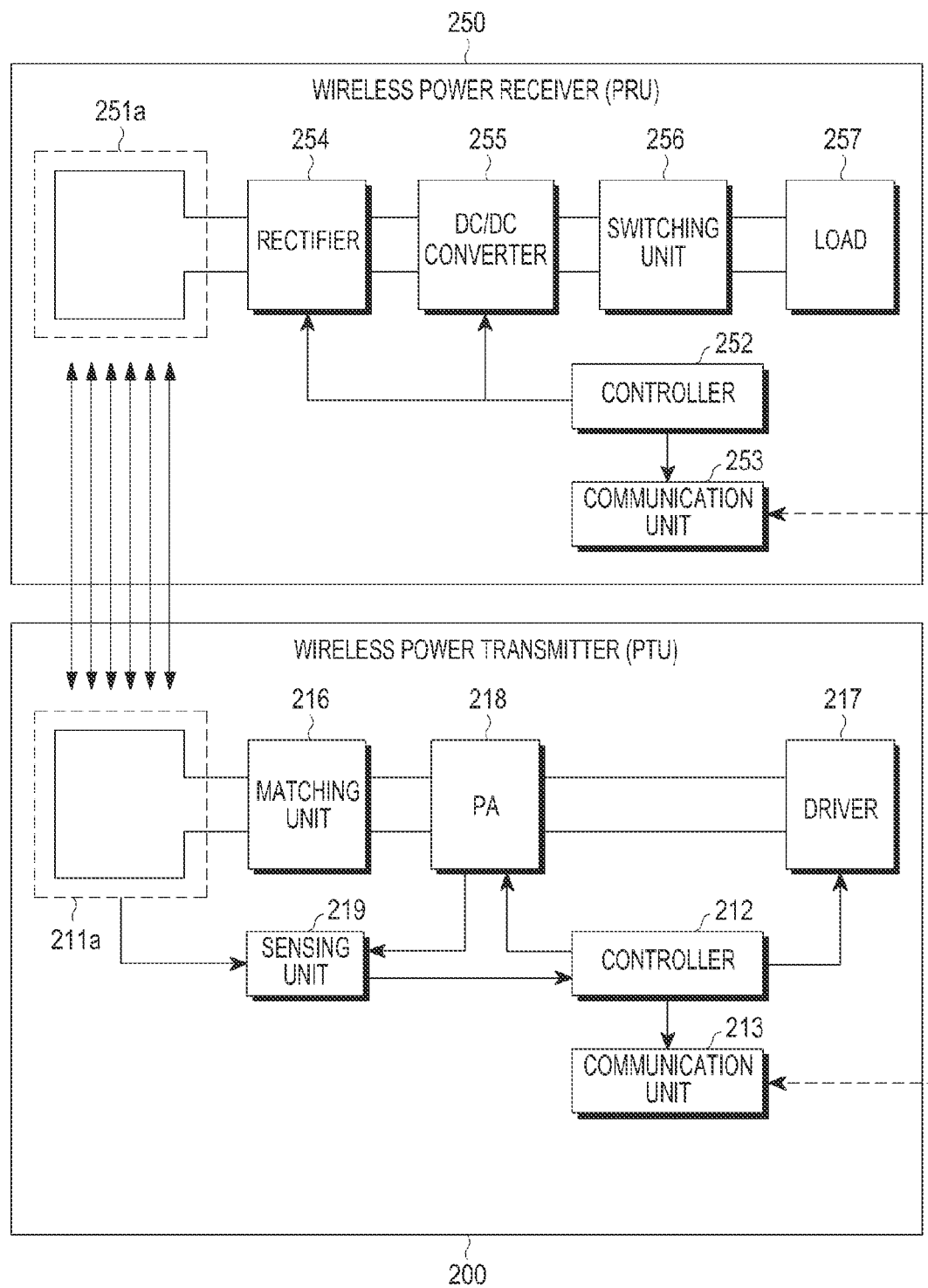
FIG. 3B is a block diagram illustrating a wireless power transmitter and a wireless power receiver according to an embodiment of the present invention.

FIG. 3B is a block diagram illustrating a wireless power transmitter and a wireless power receiver according to an embodiment of the present invention.

Referring to FIG. 3B, the wireless power transmitter 200 includes at least one of a Transmission (Tx) resonator 211a, a controller 212 (for example, a Micro Controller Unit (MCU)), a communication unit 213 (for example, an out-of-band signaling unit), a driver (e.g. power supply) 217, a Power Amplifier (PA) 218, a matching unit 216, and a sensing unit 219. The wireless power receiver 250 includes at least one of a Reception (Rx) resonator 251a, the controller 252, the communication unit 253, a rectifier 254, a DC/DC converter 255, a switching unit 256, and a load 257.

The driver 217 outputs DC power having a predetermined voltage level. The voltage level of the DC power output from the driver 217 is controlled by the controller 212.

A DC current output from the driver 217 is applied to the PA 218. The PA 218 amplifies the DC current with a predetermined gain. Further, the PA 218 converts DC power to AC power based on a signal received from the controller 212. Therefore, the PA 218 outputs the AC power.

The matching unit 216 performs impedance matching. For example, the matching unit 216 controls impedance viewed from the matching unit 216 so that its output power has high efficiency or high power. The sensing unit 219 senses a load variation of the wireless power receiver 250 via the Tx resonator 211a or the PA 218 and provides the sensing result to the controller 212.

The matching unit 216 adjusts impedance under control of the controller 212. The matching unit 216 includes at least one of a coil and a capacitor. The controller 212 controls a connection state to at least one of the coil and the capacitor and, thus, performs impedance matching accordingly.

The Tx resonator 211a transmits AC power to the Rx resonator 251a. The Tx resonator 211a and the Rx resonator 251a are configured as resonant circuits having the same resonant frequency. For example, the resonant frequency may be determined to be 6.78 MHz.

The communication unit 213 communicates with the communication unit 253 of the wireless power receiver 250, for example, hi-directionally at 2.4 GHz (by Wireless Fidelity (WiFi), ZigBee, or Bluetooth (BT)/Bluetooth Low Energy (BLE)).

The Rx resonator 251a receives power for charging.

The rectifier 254 rectifies wireless power received from the Rx resonator 251a to DC power. For example, the rectifier 254 may be configured as a diode bridge. The DC/DC converter 255 converts the rectified power with a predetermined gain. For example, the DC/DC converter 255 converts the rectified power so that the voltage at its output is 5V. A minimum voltage value and a maximum voltage value that may be applied to the input of the DC/DC converter 255 may be preset.

The switching unit 256 connects the DC/DC converter 255 to the loading unit 257. The switching unit 256 is kept in an ON or OFF state under the control of the controller 252. The switching unit 256 may be omitted, if the switching unit 256 is in the ON state, the loading unit 257 stores the converted power received from the DC/DC converter 255.

Figure 4:
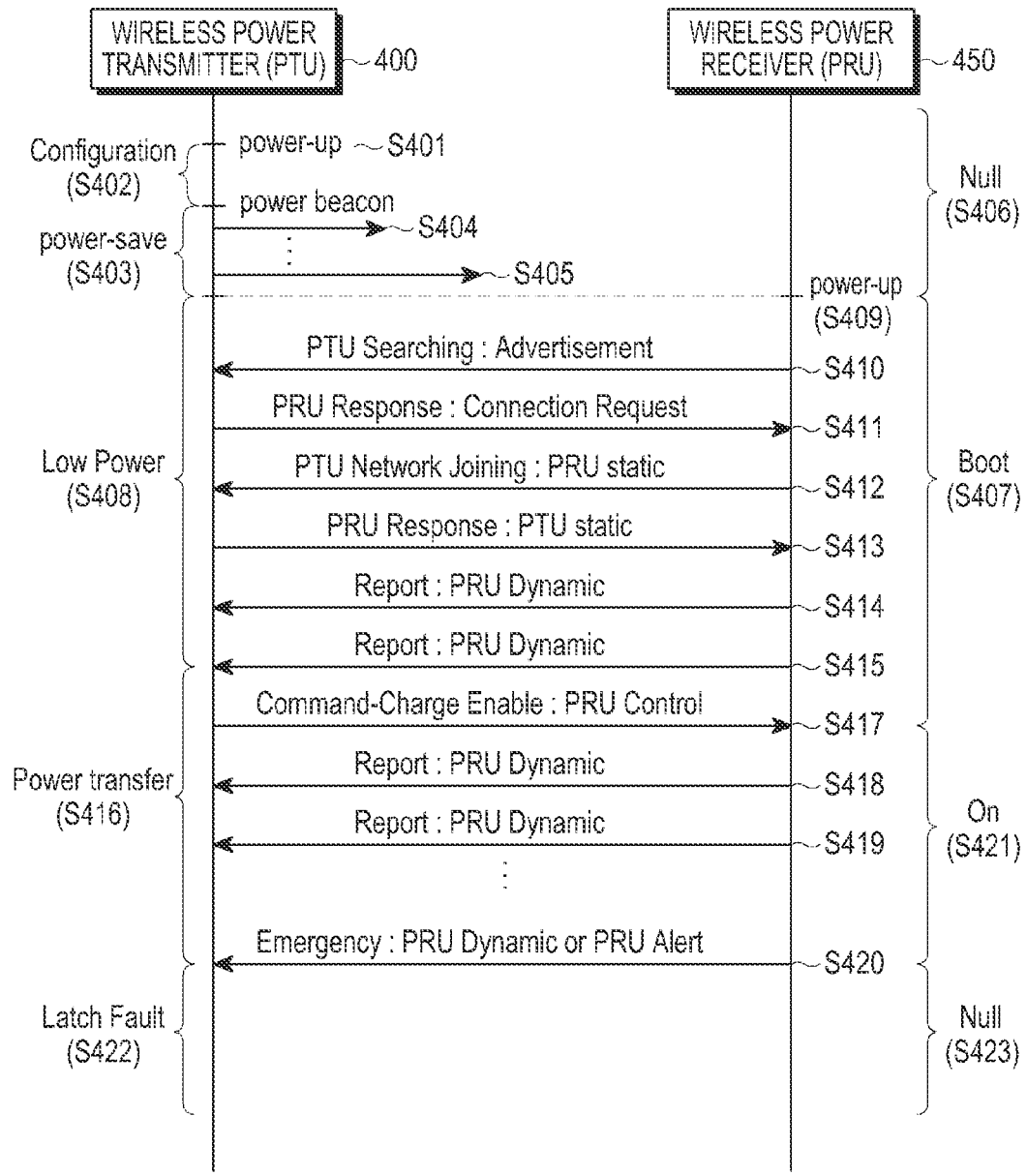
FIG. 4 is a signal flow diagram of a method of a wireless power transmitter and a wireless power receiver according to an embodiment of the present invention.

FIG. 4 is a signal flow diagram of a method of a wireless power transmitter and a wireless power receiver according to an embodiment of the present invention.

Referring to FIG. 4, a wireless power transmitter 400 is turned on or powered-up in step S401. Upon power-on the wireless power transmitter 400 configures an environment in step S402.

The wireless power transmitter 400 enters a power save mode in step S403. In the power save mode, the wireless power transmitter 400 applies different types of power beacons for detection, with their respective periods, which are described below in greater detail with reference to FIG. 6. For example, the wireless power transmitter 400 transmits power beacons in steps 404 and S405, respectively, for detection (for example, short beacons or long beacons) and the power beacons in steps S404 and S405 may have different power values. One or both of the power beacons in steps S404 and S405 for detection may have sufficient power to drive the communication unit of a wireless power receiver 450. For example, the wireless power receiver 450 communicates with the wireless power transmitter 400 by driving its communication unit by means of one or both of the power beacons transmitted in steps 404 and 405 for detection. This state may be referred to as a null state.

The wireless power transmitter 400 detects a load variation caused by disposition of the wireless power receiver 450. The wireless power transmitter 400 enters a low power mode in step S408. The low power mode is described below in greater detail with reference to FIG. 6. The wireless power receiver 450 drives the communication unit with power received from the wireless power transmitter 400 in step S409.

The wireless power receiver 450 transmits a PTU searching signal to the wireless power transmitter 400 in step S410. The wireless power receiver 450 transmits the PTU searching signal by a BLE-based ADvertisement (AD) signal. The wireless power receiver 450 transmits the PTU searching signal periodically until it receives a response signal from the wireless power transmitter 400 or a predetermined time period lapses.

Upon receipt of the PTU searching signal from the wireless power receiver 450, the wireless power transmitter 400 transmits a PRU response signal in step S411. The PRU response signal establishes a connection between the wireless power transmitter 400 and the wireless power receiver 450.

The wireless power receiver 450 transmits a PRU static signal in step S412. The PRU static signal indicates a state of the wireless power receiver 450 and requests joining a wireless power network managed by the wireless power transmitter 400.

The wireless power transmitter 400 transmits a PTU static signal in step S413. The PTU static signal indicates capabilities of the wireless power transmitter 400.

Once the wireless power transmitter 400 and the wireless power receiver 450 transmit and receive the PRU static signal and the PTU static signal, the wireless power receiver 450 transmit a PRU dynamic signal periodically in steps S414 and S415. The PRU dynamic signal includes at least one parameter measured by the wireless power receiver 450. For example, the PRU dynamic signal may include information about a voltage at the output of a rectifier of the wireless power receiver 450. The state of the wireless power receiver 450 may be referred to as a boot state in step S407.

The wireless power transmitter 400 enters a power transfer mode in step S416. The wireless power transmitter 400 transmits a PRU control signal commanding charging to the wireless power receiver 450 in step S417. In the power transfer mode, the wireless power transmitter 400 transmits charging power.

The PRU control signal transmitted by the wireless power transmitter 400 includes information that enables/disables charging of the wireless power receiver 450 and permission information. The PRU control signal may be transmitted each time a charged state is changed. For example, the PRU control signal may be transmitted every 250 ms or upon an occurrence of a parameter change. The PRU control signal may be configured to be transmitted within a predetermined threshold time, for example, within 1 second, even though a parameter is not changed.

The wireless power receiver 450 changes a setting according to the PRU control signal and transmits a NW dynamic signal to report a state of the wireless power receiver 450 in steps S418 and S419. The PRU dynamic signal transmitted by the wireless power receiver 450 includes information about at least one of a voltage, a current, a wireless power receiver state, and a temperature. The state of the wireless power receiver 450 may be referred to as an ON state.

The PRU dynamic signal may have the following data structure illustrated in Table 1 below.

Table 1

| Field | Octets | Description | Use | Units |
|---|---|---|---|---|
| Optional fields | 1 | Defines which optional fields are populated | Mandatory | |
| $V_{RECT}$ | 2 | Voltage at diode output | Mandatory | mV |

-continued

Table 1

| Field | Octets | Description | Use | Units |
|---|---|---|---|---|
| $I_{RECT}$ | 2 | Current at diode output | Mandatory | mA |
| $V_{OUT}$ | 2 | Voltage at charge/battery port | Optional | mV |
| $I_{OUT}$ | 2 | Current at charge/battery port | Optional | mA |
| Temperature | 1 | Temperature of PRU | Optional | Deg C. from −40 C. |
| $V_{RECT\_MIN\_DYN}$ | 2 | $V_{RECT\_LOW\_LIMIT}$(dynamic value) | Optional | mV |
| $V_{RECT\_SET\_DYN}$ | 2 | Desired $V_{RECT}$(dynamic value) | Optional | mV |
| $V_{RECT\_HIGH\_DYN}$ | 2 | $V_{RECT\_HIGH\_LIMIT}$(dynamic value) | Optional | mV |
| PRU alert | 1 | Warnings | Mandatory | Bit field |
| RFU | 3 | Undefined | | |

Referring to Table 1, the PRU dynamic signal includes one or more fields. The fields provide optional field information, information about a voltage at the output of the rectifier of the wireless power receiver, information about a current at the output of the rectifier of the wireless power receiver, information about a voltage at the output of the DC/DC converter of the wireless power receiver, information about a current at the output of the DC/DC converter of the wireless power receiver, temperature information, information about a minimum voltage value $V_{RECT\_MIN\_DYN}$ at the output of the rectifier of the wireless power receiver, information about an optimum voltage value $V_{RECT\_SET\_DYN}$ at the output of the rectifier of the wireless power receiver, information about a maximum voltage value $V_{RECT\_HIGH\_DYN}$ at the output of the rectifier of the wireless power receiver, and warning information. The PRU dynamic signal includes at least one of the above fields.

For example, at least one voltage set value that has been determined according to a charging situation (for example, the information about a minimum voltage value $V_{RECT\_MIN\_DYN}$ at the output of the rectifier of the wireless power receiver, the information about an optimum voltage value $V_{RECT\_SET\_DYN}$ at the output of the rectifier of the wireless power receiver, and the information about a maximum voltage value $V_{RECT\_HIGH\_DYN}$ at the output of the rectifier of the wireless power receiver) is transmitted in the at least one field of the PRU dynamic signal. Upon receipt of the PRU dynamic signal, the wireless power transmitter adjusts a wireless charging voltage to be transmitted to each wireless power receiver based on the voltage value set in the PRU dynamic signal.

Among the fields, PRU Alert may be configured in the data structure illustrated in Table 2 below.

Referring to Table 2, PRU Alert includes a bit for a restart request, a bit for transition, and a bit for Travel Adapter (TA) detect. The TA detect bit indicates that a wireless power receiver has been connected to a wired charging terminal in the wireless power transmitter that provides wireless charging. The Transition hit indicates to the wireless power transmitter that a communication Integrated Circuit (IC) of the wireless power receiver is reset before the wireless power receiver transitions from the SA mode to the NSA mode. Finally, the restart request bit indicates that the wireless power transmitter is ready to resume charging of the wireless power receiver, when the wireless power transmitter that has discontinued charging by reducing transmission power due to overcurrent or overtemperature returns to a normal state.

PRU Alert may also be configured in the data structure illustrated in Table 3 below.

TABLE 3

| 7 | 6 | 5 | 4 | 3 | 2 | 1 | 0 |
|---|---|---|---|---|---|---|---|
| PRU over-voltage | PRU over-current | PRU over-temperature | PRU Self Protection | Charge Complete | Wired Charger Detect | Mode Transition Bit 1 | Mode Transition Bit 0 |

Referring to Table 3], PRU Alert includes the fields of overvoltage, overtemperature, PRU Self Protection, Charge Complete, Wired Charger Detect, and Mode Transition. If the overvoltage field is set to "1," this may imply that the voltage Vrect of the wireless power receiver has exceeded an overvoltage limit. The overcurrent and overtemperature fields may be set in the same manner as the overvoltage field. PRU Self Protection refers to when the wireless power receiver protects itself by directly reducing power affecting a load. In this case, the wireless power transmitter does not need to change a charged state.

According to an embodiment of the present invention, bits for Mode Transition may be set to a value indicating the duration of a mode transition to the wireless power transmitter. The Mode Transition bits may be configured as illustrated in Table 4 below.

TABLE 2

| 7 | 6 | 5 | 4 | 3 | 2 | 1 | 0 |
|---|---|---|---|---|---|---|---|
| Overvoltage | Overcurrent | Overtemp | Charge complete | TA detect | Transition | restart request | RFU |

TABLE 4

| Value(Bit) | Mode Transition Bit Description |
|---|---|
| 00 | No Mode Transition |
| 01 | 2 s Mode Transition time limit |
| 10 | 3 s Mode Transition time limit |
| 11 | 6 s Mode Transition time limit |

Referring to Table 4, if the Mode Transition bits are set to "00," this indicates no mode transition. If the Mode Transition bits are set to "01," this indicates that a time limit for completion of a mode transition is 2 seconds. If the Mode Transition bits are set to "10," this indicates that the time limit for completion of a mode transition is 3 seconds. If the Mode Transition bits are set to "11," this indicates that the time limit for completion of a mode transition is 6 seconds.

For example, if a mode transition takes 3 seconds or less, the Mode Transition bits may be set to "10." Before starting a mode transition, the wireless power receiver ensures that no impedance shift will occur during the mode transition by changing an input impedance setting to match a 1.1 W power draw. Accordingly, the wireless power transmitter adjusts power ITX_COIL for the wireless power receiver according to this setting and thus may maintain the power ITX_COIL for the wireless power receiver during the mode transition.

Therefore, once a mode transition duration is set by the Mode Transition bits, the wireless power transmitter maintains the power ITX_COIL for the wireless power receiver during the mode transition duration, for example, for 3 seconds. In other words, even though the wireless power transmitter does not receive a response from the wireless power receiver for 3 seconds, the wireless power transmitter maintains a connection to the wireless power receiver. However, after the mode transition duration lapses, the wireless power transmitter ends the power transmission, considering that the wireless power receiver is a rogue object.

The wireless power receiver 450 senses the generation of an error. The wireless power receiver 450 transmits a warning signal to the wireless power transmitter 400 in step S420 when an error is generated. The warning signal is transmitted by a PRU dynamic signal or an alert signal. For example, the wireless power receiver 450 transmits the PRU Alert field illustrated in Table 1 to indicate an error state to the wireless power transmitter 400. Alternatively, the wireless power receiver 450 may transmit a stand-alone warning signal indicating an error state to the wireless power transmitter 400. Upon receipt of the warning signal, the wireless power transmitter 400 enters a latch fault mode in step S422. The wireless power receiver 450 enters a null state in step S423.

Figure 5:
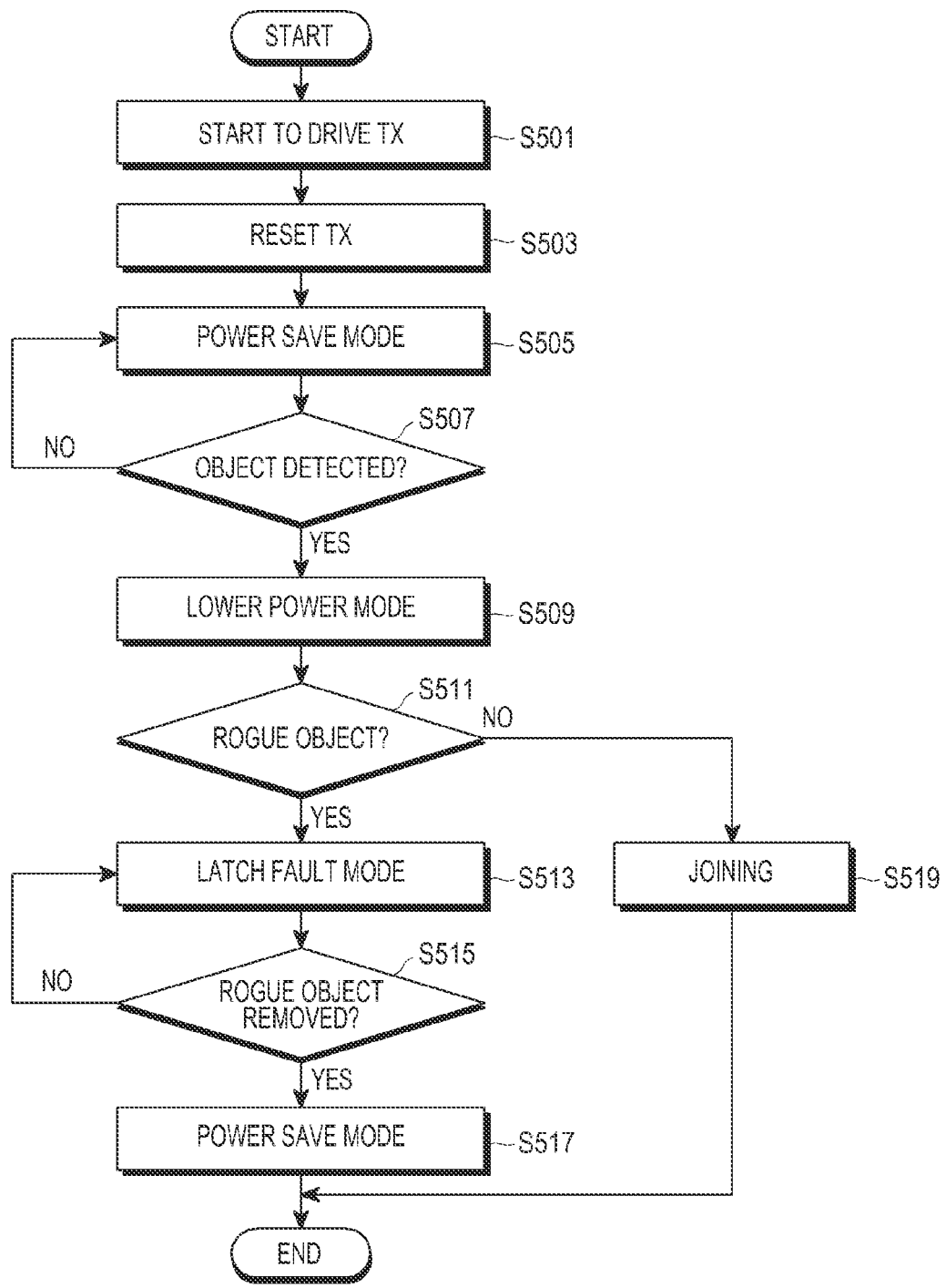
FIG. 5 is a flowchart of a method for controlling a wireless power transmitter and a wireless power receiver according to an embodiment of the present invention.
Figure 6:
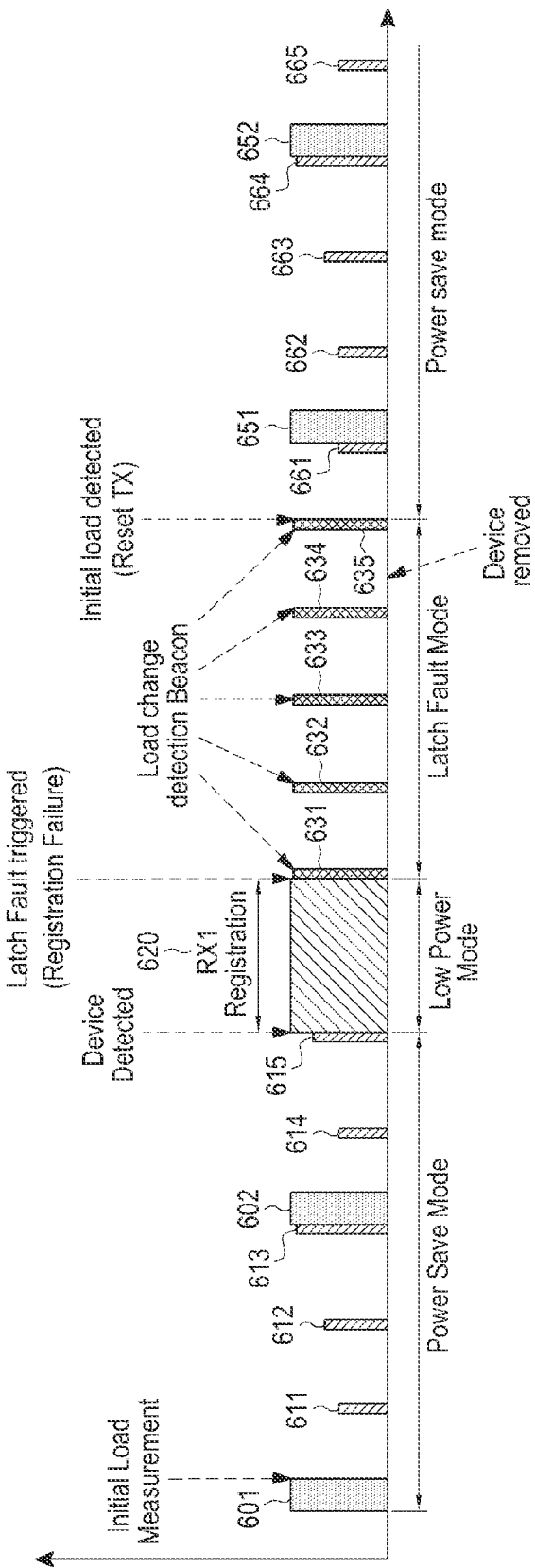
FIG. 6 is a graph illustrating amounts of power applied by a wireless power transmitter with respect to a time axis.

FIG. 5 is a flowchart of a method of a wireless power transmitter and a wireless power receiver according to another embodiment of the present invention. The control method of FIG. 5 is described in detail with reference to FIG. 6. FIG. 6 is a graph illustrating amounts of power applied by the wireless power transmitter with respect to a time axis.

Referring to FIG. 5, the wireless power transmitter starts operating in step S501. Further, the wireless power transmitter resets an initial setting in step S503 and enters the power save mode in step S505. The wireless power transmitter applies different types of power having different power amounts to a power transmitter in the power save mode. For example, the wireless power transmitter applies the second detection power 601 and 602 and the third detection power 611 to 615 to the power transmitter in FIG. 6. The wireless power transmitter applies the second detection power 601 and 602 periodically with a second period. When the wireless power transmitter supplies the second detection power 601 and 602, the second detection power 601 and 602 lasts for a second time duration. The wireless power transmitter applies the third detection power 611 to 615 periodically with a third period. When the wireless power transmitter supplies the third detection power 611 to 615, the third detection power 611 to 615 lasts for a third time duration. The third detection power 611 to 615 may have the same power value, or different power values as illustrated in FIG. 6.

After outputting the third detection power 611, the wireless power transmitter outputs the third detection power 612 having the same power amount. If the wireless power transmitter outputs the third detection power 611 having the same amount as described above, the third detection power 611 may have a power amount sufficient to detect the smallest wireless power receiver, for example, a wireless power receiver of category 1.

On the other hand, after outputting the third detection power 611, the wireless power transmitter may output the third detection power 612 having a different power amount. If the wireless power transmitter outputs different amounts of third detection power as described above, the respective power amounts of the third detection power may be sufficient to detect wireless power receivers of category 1 to category 5. For example, the third detection power 611 may have a power amount sufficient to detect a wireless power receiver of category 5 the third detection power 612 may have a power amount sufficient to detect a wireless power receiver of category 3, and the third detection power 613 may have a power amount sufficient to detect a wireless power receiver of category 1.

The second detection power 601 and 602 drives the wireless power receiver. More specifically, the second detection power 601 and 602 may have a power amount sufficient to drive the controller and/or the communication unit of the wireless power receiver.

The wireless power transmitter applies the second detection power 601 and 602 and the third detection power 611 to 615, respectively, with the second and third periods to the wireless power receiver. If the wireless power receiver is placed on the wireless power transmitter, an impedance viewed from the wireless power transmitter may be changed. The wireless power transmitter may detect an impedance shift during application of the second detection power 601 and 602 and the third detection power 611 to 615. For example, the wireless power transmitter may detect an impedance shift during application of the third detection power 615. Therefore, the wireless power transmitter may detect an object in step S507. If no object is detected (e.g., "No" in step S507), the wireless power transmitter is kept in the power save mode in which it applies different types of power periodically in step S505.

If the wireless power transmitter detects an object due to an impedance shift (e.g. "Yes" in step S507), the wireless power transmitter enters the low power mode. In the low power mode, the wireless power transmitter applies a driving power having a power amount sufficient to drive the controller and the communication unit of the wireless power receiver. For example, the wireless power transmitter applies driving power 620 to the power transmitter in FIG. 6. The wireless power receiver receives the driving power 620 and drives the controller and/or the communication unit with the driving power 620. The wireless power receiver communicates with the wireless power transmitter with the driving power 620 in a predetermined communication scheme. For example, the wireless power receiver transmits and receives data required for authentication and joins a wireless power network managed by the wireless power transmitter based on the data. However, if a rogue object is placed instead of a wireless power receiver, data transmission and reception is not performed. Therefore, the wireless power transmitter determines whether the object is a rogue object in step S511. For example, if the wireless power transmitter fails to receive a response from the object for a predetermined time, the wireless power transmitter determines the object to be a rogue object.

If the wireless power transmitter determines the object to be a rogue object (e.g. "Yes" in step S511), the wireless power transmitter enters the latch fault mode in step S513. On the contrary, if the wireless power transmitter determines that the object is not a rogue object (e.g. "No" in step S511), the wireless power transmitter proceeds to a joining operation in step S519. For example, the wireless power transmitter applies first power 631 to 634 periodically with a first period in FIG. 6. The wireless power transmitter may detect an impedance shift during application of the first power. For example, if the rogue object is removed (e.g. "Yes" in step S515), the wireless power transmitter detects an impedance shift and thus determines that the rogue object has been removed. In contrast, if the rogue object is not removed (e.g. "No" in step S515), the wireless power transmitter does not detect an impedance shift and thus determines that the rogue object has not been removed. If the rogue object has not been removed, the wireless power transmitter notifies a user that the wireless power transmitter is currently in an error state by performing at least one of illuminating a lamp or outputting a warning sound. Accordingly, the wireless power transmitter includes an output unit for illuminating a lamp and/or outputting a warning sound.

If it is determined that the rogue object has not been removed (e.g. "No" in step S515), the wireless power transmitter maintains the latch fault mode in step S513. In contrast, if the rogue object has been removed (e.g. "Yes" in step S515), the wireless power transmitter reenters the power save mode in step S517. For example, the wireless power transmitter may apply second power 651 and 652 and third power 661 to 665 in FIG. 6.

As described above, if a rogue object is placed on the wireless power transmitter, instead of a wireless power receiver, the wireless power transmitter enters the latch fault mode. Further, the wireless power transmitter determines whether the rogue object has been removed based on an impedance shift that occurs according to power applied in the latch fault mode. That is, a condition of entry to the latch fault mode may be the presence of a rogue object in the embodiment illustrated in FIGS. 5 and 6. Besides the presence of a rogue object, there may be many other conditions for the wireless power transmitter to entry the latch fault mode. For example, the wireless power transmitter may be cross-connected to a mounted wireless power receiver. In this case, the wireless power transmitter may also enter the latch fault mode.

When the wireless power transmitter is cross-connected to a wireless power receiver, the wireless power transmitter must return to an initial state, and the wireless power receiver should be removed. The wireless power transmitter may set cross connection of a wireless power receiver placed on another wireless power transmitter, that is, joining of a wireless power receiver placed on another wireless power transmitter in a wireless power network managed by the wireless power transmitter, as a condition for entry to the latch fault mode. An operation of a wireless power transmitter upon occurrence of an error such as cross connection is described below with reference to FIG. 7.

Figure 7:
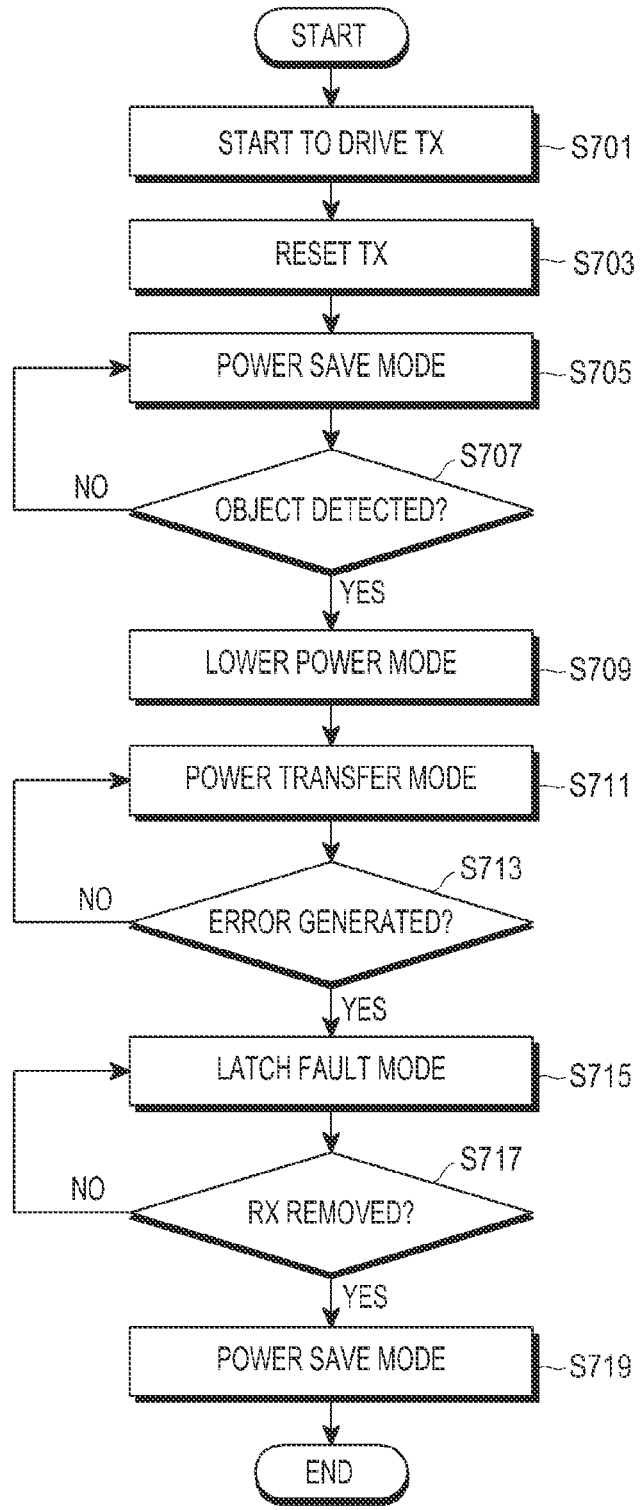
FIG. 7 is a flowchart of a method for controlling a wireless power transmitter according to an embodiment of the present invention.
Figure 8:
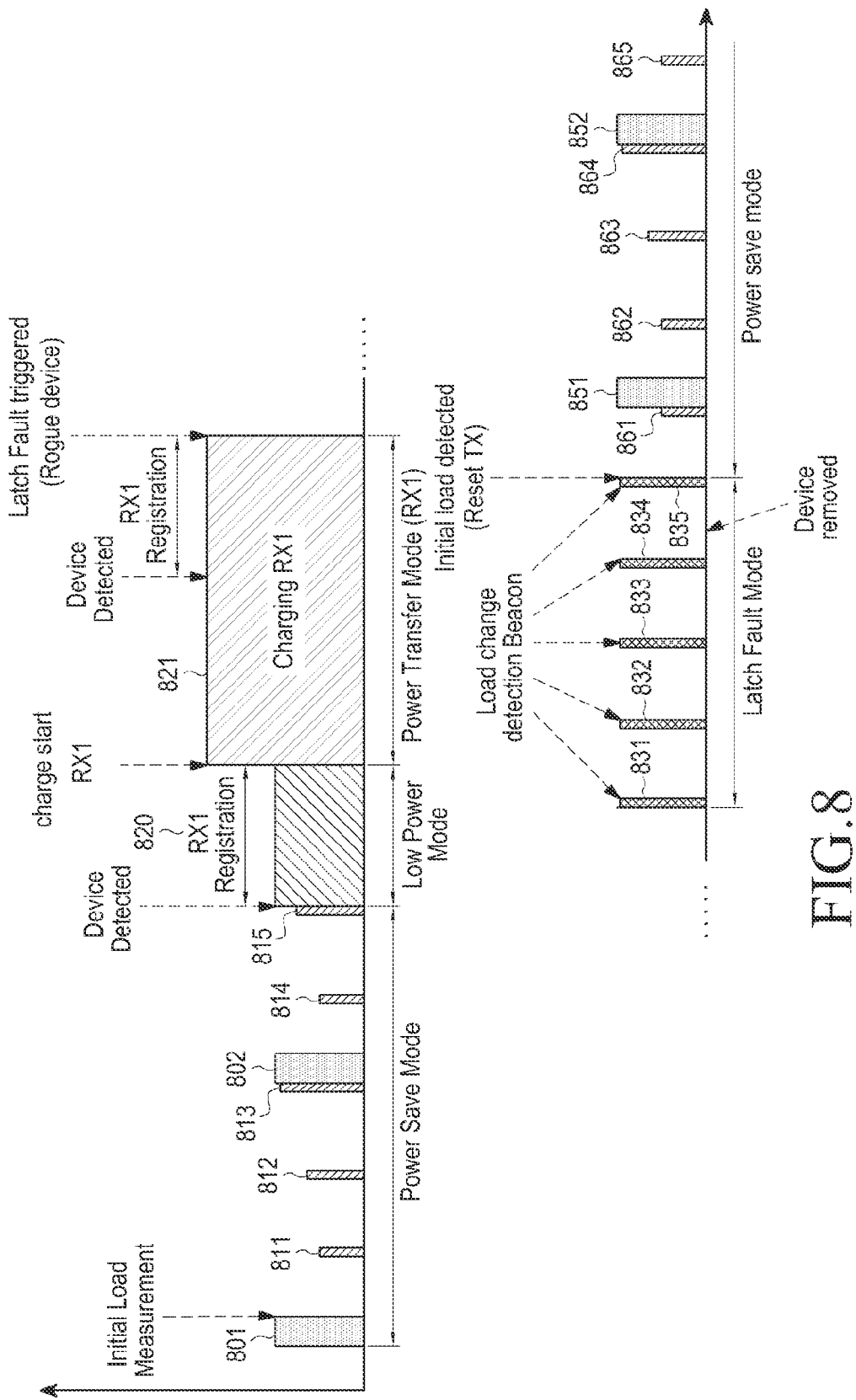
FIG. 8 is a graph illustrating amounts of power applied by a wireless power transmitter with respect to a time axis according to the flowchart of FIG. 7.

FIG. 7 is a flowchart of a method for controlling a wireless power transmitter according to an embodiment of the present invention. The control method of FIG. 7 is described in detail below with reference to FIG. 8. FIG. 8 is a graph illustrating amounts of power supplied by the wireless power transmitter with respect to a time axis according to the flowchart of FIG. 7.

Referring to FIG. 7, the wireless power transmitter starts operating in step S701. Further, the wireless power transmitter resets an initial setting in step S703 and enters the power save mode in step S705. The wireless power transmitter may apply different types of power having different power amounts to the power transmitter in the power save mode. For example, the wireless power transmitter may apply second detection power 801 and 802 and third detection power 811 to 815 to the power transmitter in FIG. 8. The wireless power transmitter may apply the second detection power 801 and 802 periodically with a second period. When the wireless power transmitter applies the second detection power 801 and 802, the second detection power 801 and 802 may last for a second time duration. The wireless power transmitter may apply the third detection power 811 to 815 periodically with a third period. When the wireless power transmitter applies the third detection power 811 to 815, the third detection power 811 to 815 may last for a third time duration. The third detection power 811 to 815 may have the same power value, or different power values as illustrated in FIG. 8.

The second detection power 801 and 802 may drive the wireless power receiver. More specifically, the second detection power 801 and 802 may have a power amount sufficient to drive the controller and/or the communication unit of the wireless power receiver.

The wireless power transmitter applies the second detection power 801 and 802 and the third detection power 811 to 815, respectively, with the second and third periods to the wireless power receiver. If the wireless power receiver is placed on the wireless power transmitter, an impedance viewed from the wireless power transmitter may be changed. The wireless power transmitter may detect an impedance shift during application of the second detection power 801 and 802 and the third detection power 811 to 815. For example, the wireless power transmitter may detect an impedance shift during application of the third detection power 815. Therefore, the wireless power transmitter may detect an object in step S707. If no object is detected (e.g. "No" in step S707), the wireless power transmitter is kept in the power save mode in which it applies different types of power periodically in step S705.

If the wireless power transmitter detects an object due to an impedance shift (e.g. "Yes" in step S707), the wireless power transmitter enters the low power mode in step S709. In the low power mode, the wireless power transmitter applies a driving power having a power amount sufficient to drive the controller and/or the communication unit of the wireless power receiver. For example, the wireless power transmitter applies driving power 820 to the power transmitter in FIG. 8. The wireless power receiver receives the driving power 820 and drives the controller and/or the communication unit with the driving power 820. The wireless power receiver communicates with the wireless power transmitter with the driving power 820 in a predetermined communication scheme. For example, the wireless power receiver transmits and receives data required for authentication and joins a wireless power network managed by the wireless power transmitter based on the data.

Subsequently, the wireless power transmitter enters the power transfer mode in which it transmits charging power in step S711. For example, the wireless power transmitter applies charging power 821, and the charging power 821 is transmitted to the wireless power receiver, as illustrated in FIG. 8.

In the power transfer mode, the wireless power transmitter determines whether an error has occurred. The error may be the presence of a rogue object, a cross connection, an overvoltage, an overcurrent, or an overtemperature. The wireless power transmitter includes a sensing unit for measuring overvoltage, overcurrent, or overtemperature. For example, the wireless power transmitter measures a voltage or current at a reference point and may determine that a measured voltage or current exceeding a threshold satisfies an overvoltage or overcurrent condition. Alternatively, the wireless power transmitter includes a temperature sensor, and the temperature sensor measures a temperature at a reference point of the wireless power transmitter. If the temperature at the reference point exceeds a threshold, the wireless power transmitter determines that an overtemperature condition is satisfied.

If the wireless power transmitter determines an overvoltage, overcurrent, or overtemperature condition according to a measured voltage, current, or temperature value, the wireless power transmitter prevents overvoltage, overcurrent, or overtemperature by decreasing wireless charging power by a predetermined value. If the voltage value of the decreased wireless charging power is below a set minimum value (for example, the minimum voltage value VRECT_MIN_DYN at the output of the rectifier of the wireless power receiver), wireless charging is discontinued and thus a voltage set value is re-adjusted according to an embodiment of the present invention.

While presence of a rogue object on the wireless power transmitter is shown as an error in the embodiment of present invention illustrated in FIG. 8, the error is not limited to the presence of the rogue object. Thus, it will be readily understood to those skilled in the art that the wireless power transmitter may operate in a similar manner regarding the presence of a rogue object, a cross connection, an overvoltage, an overcurrent, and an overtemperature.

If no error occurs (e.g. "No" in step S713), the wireless power transmitter maintains the power transfer mode in step S711. In contrast, if an error occurs (e.g. "Yes" in step S713), the wireless power transmitter enters the latch fault mode in step 715. For example, the wireless power transmitter may apply first power 831 to 835 as illustrated in FIG. 8. Further, the wireless power transmitter may output an error notification including at least one of lamp illumination or a warning sound during the latch fault mode. If it is determined that the rogue object or the wireless power receiver has not been removed (e.g. "No" in step S717), the wireless power transmitter maintains the latch fault mode in step S715. In contrast, if it is determined that the rogue object or the wireless power receiver has been removed (e.g. "Yes" in step S717), the wireless power transmitter reenters the power save mode in step S719. For example, the wireless power transmitter may apply second power 851 and 852 and third power 861 to 865 in FIG. 8.

An operation of a wireless power transmitter upon occurrence of an error during transmission of charging power is described above. Below, a description is given of an operation of the wireless power transmitter when a plurality of wireless power receivers placed on the wireless power transmitter receive charging power from the wireless power transmitter.

Figure 9:
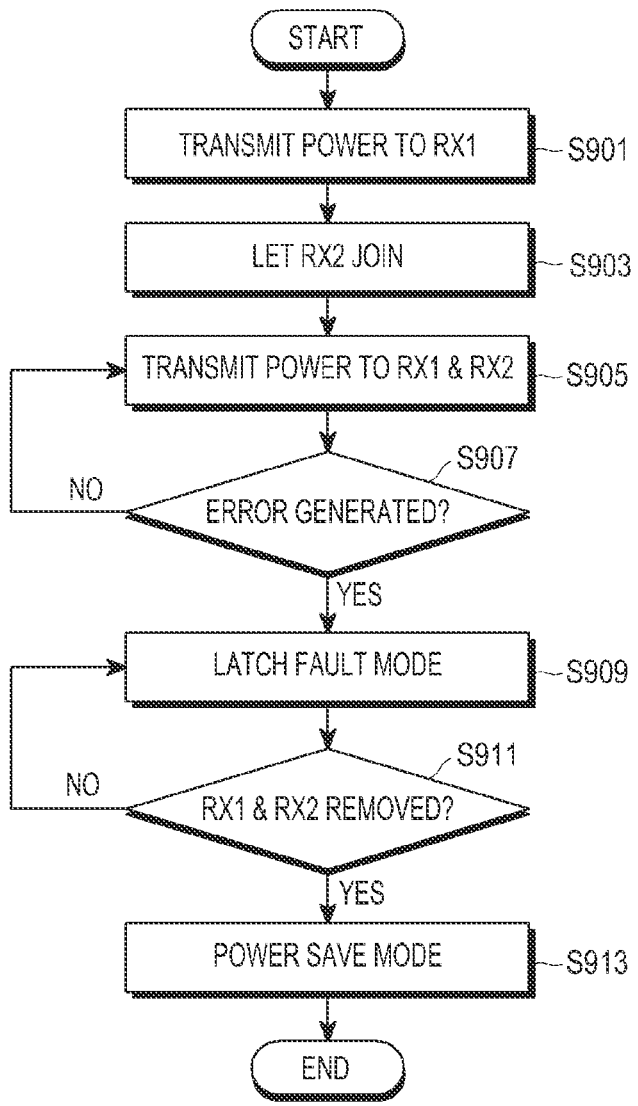
FIG. 9 is a flowchart of a method for controlling a wireless power transmitter according to an embodiment of the present invention.
Figure 10:
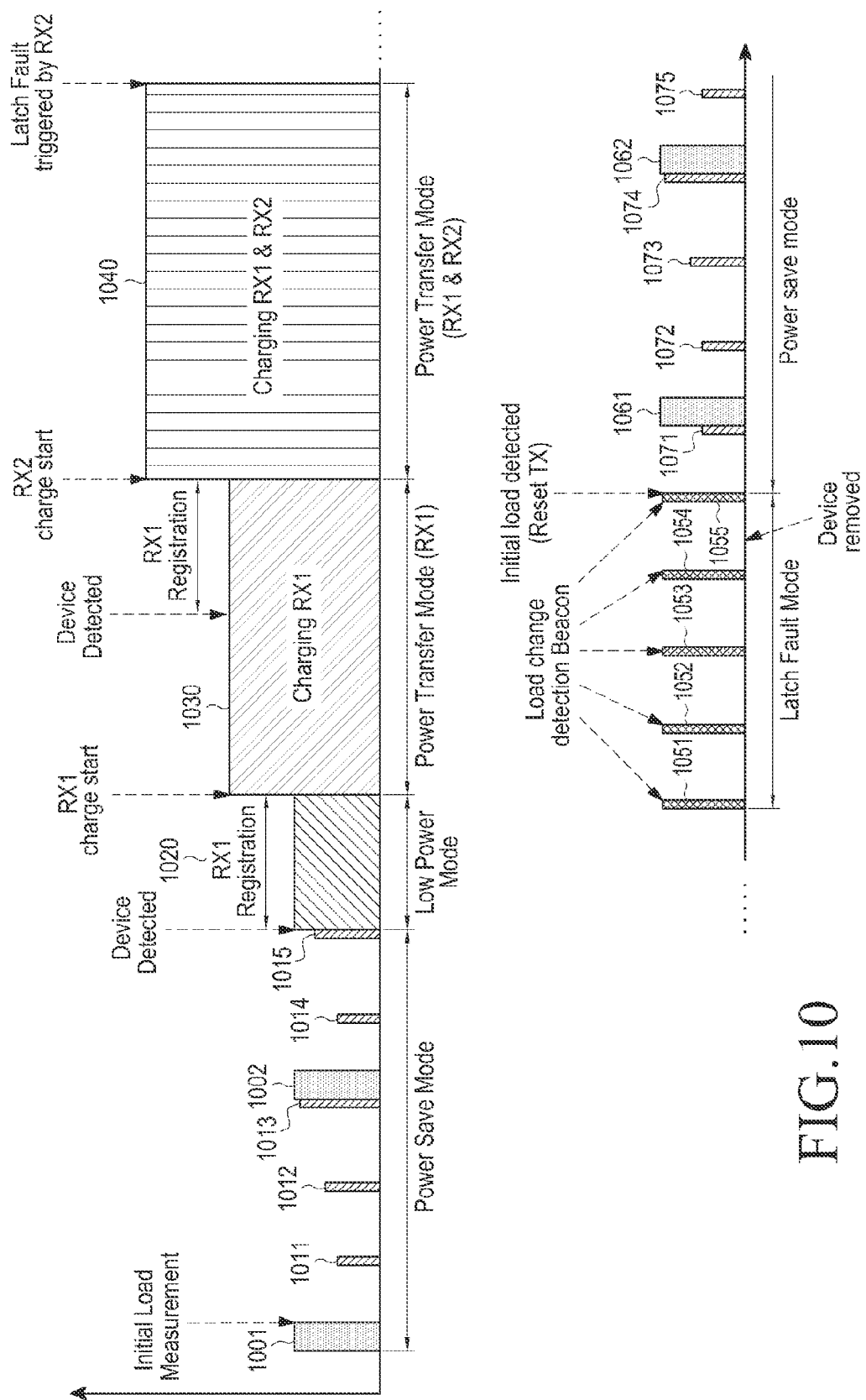
FIG. 10 is a graph illustrating amounts of power supplied by a wireless power transmitter with respect to a time axis according to the flowchart of FIG. 9.

FIG. 9 is a flowchart of a method for controlling a wireless power transmitter according to an embodiment of the present invention. The control method of FIG. 9 is described in detail with reference to FIG. 10. FIG. 10 is a graph illustrating amounts of power applied by the wireless power transmitter with respect to a time axis according to the flowchart of FIG. 9.

Referring to FIG. 9, the wireless power transmitter transmits charging power to a first wireless power receiver in step S901. The wireless power transmitter also transmits charging power to a second wireless power receiver in step S905. More specifically, the wireless power transmitter applies the sum of charging power required for the first wireless power receiver and charging power required for the second wireless power receiver to power receivers of the first and second wireless power receivers.

Steps S901 to S905 are illustrated in FIG. 10. For example, the wireless power transmitter maintains the power save mode in which the wireless power applies second detection power 1001 and 1002 and third detection power 1011 to 1015. Subsequently, the wireless power transmitter detects the first wireless power receiver and enters the low power mode in which the wireless power transmitter maintains detection power 1020. Then, the wireless power transmitter enters the power transfer mode in which the wireless power transmitter applies first charging power 1030. The wireless power transmitter detects the second wireless power receiver and allows the second wireless power receiver to join the wireless power network, in addition, the wireless power transmitter applies second charging power 1040, which is the sum of charging power required for the first wireless power receiver and charging power required for the second wireless power receiver.

Referring to FIG. 9, while transmitting charging power to both the first and second wireless power receivers in step S905, the wireless power transmitter detects an error in step S907. As described above, the error may be the presence of a rogue object, a cross connection, an overvoltage, an overcurrent, or an overtemperature. If no error occurs (e.g. "No" in step S907), the wireless power transmitter continues to apply second charging power 1040.

In contrast, if an error occurs (e.g. "Yes" in step S907), the wireless power transmitter enters the latch fault mode in step S909. For example, the wireless power transmitter applies first power 1051 to 1055 with a first period as illustrated in FIG. 10. The wireless power transmitter determines whether both the first and second wireless power receivers have been removed in step S911. For example, the wireless power transmitter detects an impedance shift while applying the first power 1051 to 1055. The wireless power transmitter determines whether both the first and second wireless power receivers have been removed by checking whether the impedance has returned to an initial value.

If determining that both the first and second wireless power receivers have been removed (e.g. "Yes" in step S911), the wireless power transmitter enters the power save mode in step S913. For example, the wireless power transmitter applies second detection power 1061 and 1062 and third detection power 1071 to 1075, respectively, with second and third periods, as illustrated in FIG. 10.

As described above, even though the wireless power transmitter applies charging power to a plurality of wireless power receivers, upon occurrence of an error, the wireless power transmitter determines whether a wireless power receiver or a rogue object has been removed.

Figure 11:
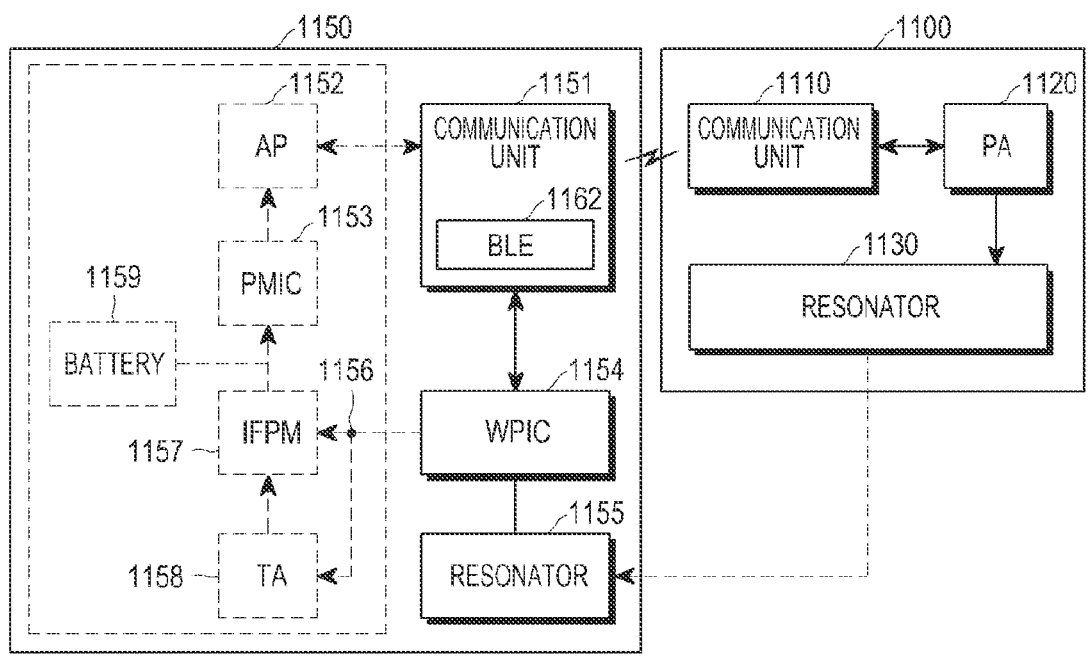
FIG. 11 is a block diagram illustrating a wireless power transmitter and a wireless power receiver in a Stand Alone (SA) mode according to an embodiment of the present invention.

FIG. 11 is a block diagram of a wireless power transmitter and a wireless power receiver in the Stand Alone (SA) mode according to an embodiment of the present invention.

Referring to FIG. 11, a wireless power transmitter 1100 includes a communication unit 1110, a PA 1120, and a resonator 1130. A wireless power receiver 1150 includes a communication unit 1151, an Application Processor (AP) 1152, a Power Management Integrated Circuit (PMIC) 1153, a Wireless Power Integrated Circuit (WPIC) 1154, a resonator 1155, an Interface Power Management IC (IFPM) 1157, a TA 1158, and a battery 1159.

The communication unit 1110 may be configured as a WiFi/BT combo IC and communicates with the communication unit 1151 in a predetermined communication scheme, for example, in BLE. For example, the communication unit 1151 of the wireless power receiver 1150 transmits a PRU dynamic signal having the data structure illustrated in Table 1 to the communication unit 1110 of the wireless power transmitter 1100. As described above, the PRU dynamic signal includes at least one of voltage information, current information, and temperature information about the wireless power receiver 1150.

An output power value from the PA 1120 is adjusted based on the received PRU dynamic signal. For example, if overvoltage, overcurrent, or overtemperature is applied to the wireless power receiver 1150, a power value output from the PA 1120 is decreased. If the voltage or current of the wireless power receiver 1150 is below a predetermined value, the power value output from the PA 1120 is increased.

Charging power from the resonator 1130 is transmitted wirelessly to the resonator 1155.

The WPIC 1154 rectifies the charging power received from the resonator 1155 and performs DC/DC conversion on the rectified charging power. The WPIC 1154 drives the communication unit 1151 or charges the battery 1159 with the converted power.

A wired charging terminal may be inserted into the TA 1158. A wired charging terminal such as a 30-pin connector or a Universal Serial Bus (USB) connector may be inserted into the TA 1158. The TA 1158 receives power from an external power source and charges the battery 1159 with the received power.

The IFPM 1157 processes the power received from the wired charging terminal and outputs the processed power to the battery 1159 and the PMIC 1153.

The PMIC 1153 manages power received wirelessly or wiredly and power applied to each component of the wireless power receiver 1150. The AP 1152 receives power information from the PMIC 1153 and controls the communication unit 1151 to transmit a PRU dynamic signal for reporting the power information.

A node 1156 connected to the WPIC 1154 is connected to the TA 1158. If a wired charging connector is inserted into the TA 1158, a predetermined voltage, for example, 5 V may be applied to the node 1156. The WPIC 1154 determines whether the wired charging adaptor has been inserted by monitoring a voltage applied to the node 1156.

The AP 1152 has a stack of a predetermined communication scheme, for example, a WiFi/BT/BLE stack. Accordingly, for communication for wireless charging, the communication unit 1151 loads the stack from the AP 1152 and than communicates with the communication unit 1110 of the wireless power transmitter 1100, based on the stack by BT/BLE.

However, data for wireless power transmission might not be retrieved from the AP 1152 due to poster-off of the AP 1152 or too much power is lost to maintain an ON state of the AP 1152 during retrieval of data from a memory of the AP 1152 and use of the retrieved data.

If the residual power amount of the battery 1159 is below a minimum power limit as described above, the AP 1152 is turned off and the battery 1159 is wirelessly charged using some components for wireless charging in the wireless power receiver 1150, for example, the communication unit 1151, the WPIC 1154, and the resonator 1155. A state in which power sufficient to turn on the AP 1152 cannot be supplied may be referred to as a dead battery state.

Because the AP 1152 is not operated in the dead battery state, the communication unit 1151 does not receive the stack of the predetermined communication scheme, for example, the WiFi/BT/BLE stack from the AP 1152. In this case, a part of the stack of the predetermined communication scheme, for example, a BLE stack is fetched from the AP 1152 and stored in a memory 1162 of the communication unit 1151. Accordingly, the communication unit 1151 communicates with the wireless power transmitter 1100 using the stack of the communication scheme stored in the memory 1162, that is, a wireless charging protocol, for wireless charging. The communication unit 1151 has an internal memory. The BLE stack is stored in a Read Only Memory (ROM) in the SA mode.

As described above, a mode in which the communication unit 1151 communicates using the stack of the communication scheme stored in the memory 1162 may be referred to as the SA mode. Accordingly, the communication unit 1151 manages the charging procedure based on the BLE stack.

With reference to FIGS. 2 to 11, the concept of the wireless charging system applicable to the embodiments of the present invention has been described above. Below, a method for determining cross charging according to an embodiment of the present invention is described in detail with reference to FIGS. 12 to 17.

Figure 12:
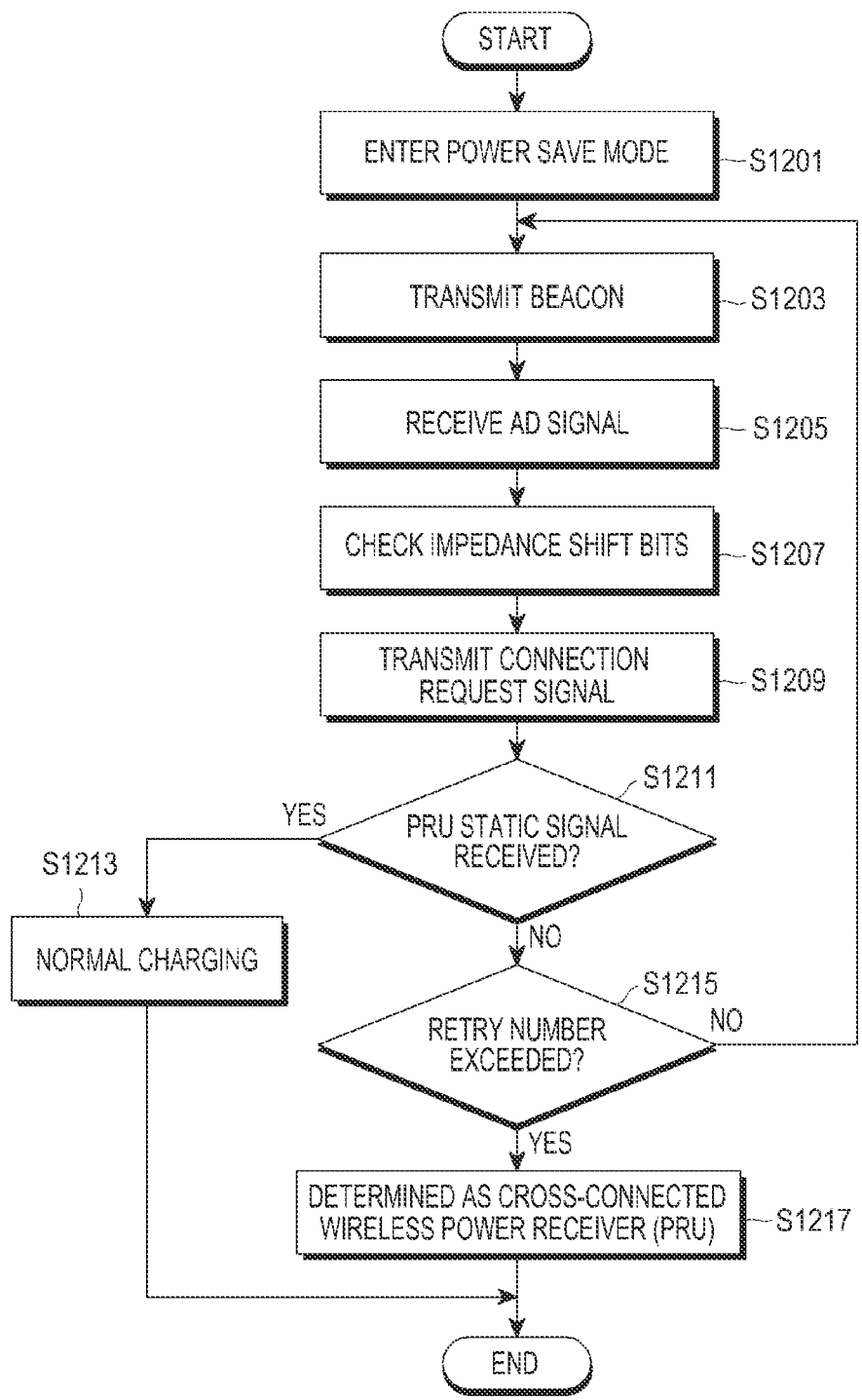
FIG. 12 is a flowchart of a method for determining cross-connection according to an embodiment of the present invention.

FIG. 12 is a flowchart of a method for determining cross connection according to an embodiment of the present invention.

Referring to FIG. 12, when a wireless power transmitter is powered on and enters the power save mode in step S1201, the wireless power transmitter transmits power of a short beacon and/or power of a long beacon to a wireless power receiver in step S1203.

If the wireless power transmitter determines that the wireless power receiver does not cause a load variation (e.g. an impedance shift), the wireless power transmitter transmits power to the wireless power receiver by a long beacon. The wireless power receiver drives an MCU and/or a communication unit (BLE) by the power transmitted in the long beacon.

The operated wireless power receiver notifies the wireless power transmitter that the wireless power receiver has received the power and has woken up by transmitting an Advertisement (AD) signal to the wireless power transmitter.

Upon receipt of the AD signal from the wireless power receiver in step S1205, the wireless power transmitter determines whether the wireless power receiver indicates that it cannot make an impedance shift or it is of category 1 (for example, low power consumption) by checking impedance shift hits in the AD signal in step S1207.

The AD signal includes the following fields illustrated in Table 5 and Table 6.

TABLE 5

| Flags AD Type | Service Data AD Type | | | |
|---|---|---|---|---|
| Flags | WPT Service 16-bit UUID | GATT Primary Service Handle | PRU RSSI Parameters | ADV flags |

TABLE 6

| 7 | 6 | 5 | 4 | 3 | 2 | 1 | 0 |
|---|---|---|---|---|---|---|---|
| Impedance Shift Bit 2 | Impedance Shift Bit 1 | Impedance Shift Bit 0 | Reboot Bit | OVP Status (optional) | Time Set Support | RFU | RFU |

In Table 6 above, a 3-bit Impedance Shift may be defined as illustrated in Table 7 below.

Table 7

| Impedance Shift Bits | Definition |
|---|---|
| 000 | Can never create an impedance shift |
| 001 | Cat 1 PRU |
| 010 | Cat 2 PRU |
| 011 | Cat 3 PRU |
| 100 | Cat 4 PRU |
| 101 | Cat 5 PRU |
| 110 | Reserved |
| 111 | Reserved | if the wireless power receiver cannot cause an impedance shift, or if a Received Signal Strength Indication (RSSI) is greater than or equal to a predetermined value in spite of no load variation, the wireless power transmitter transmits a connection request signal to the wireless power receiver after receiving the AD signal from the wireless power receiver in step S1209 and starts communication in step S1213.

If the wireless power receiver fails to receive the connection request signal due to a factor such as a communication failure, the wireless power transmitter does not receive a static parameter in step S1211, attempt a communication at a predetermined time (for example, 500 ms) later, and receive an AD signal from the wireless power receiver.

If a timer has expired after N retries without reception of an AD signal or a connection request signal in step S1215, the wireless power transmitter determines that the wireless power receiver is not a normal wireless power receiver for charging (for example, the wireless power receiver is cross-connected) in step S1217 and reduces power transmission by entering the power save mode, the latch fault mode, or a local fault mode. If the above situation occurs while the wireless power transmitter is charging another wireless power receiver (e.g. the power transfer mode), the wireless power transmitter reduces output power or continues power transmission by returning to the latch fault mode or the power save mode.

Figure 13:
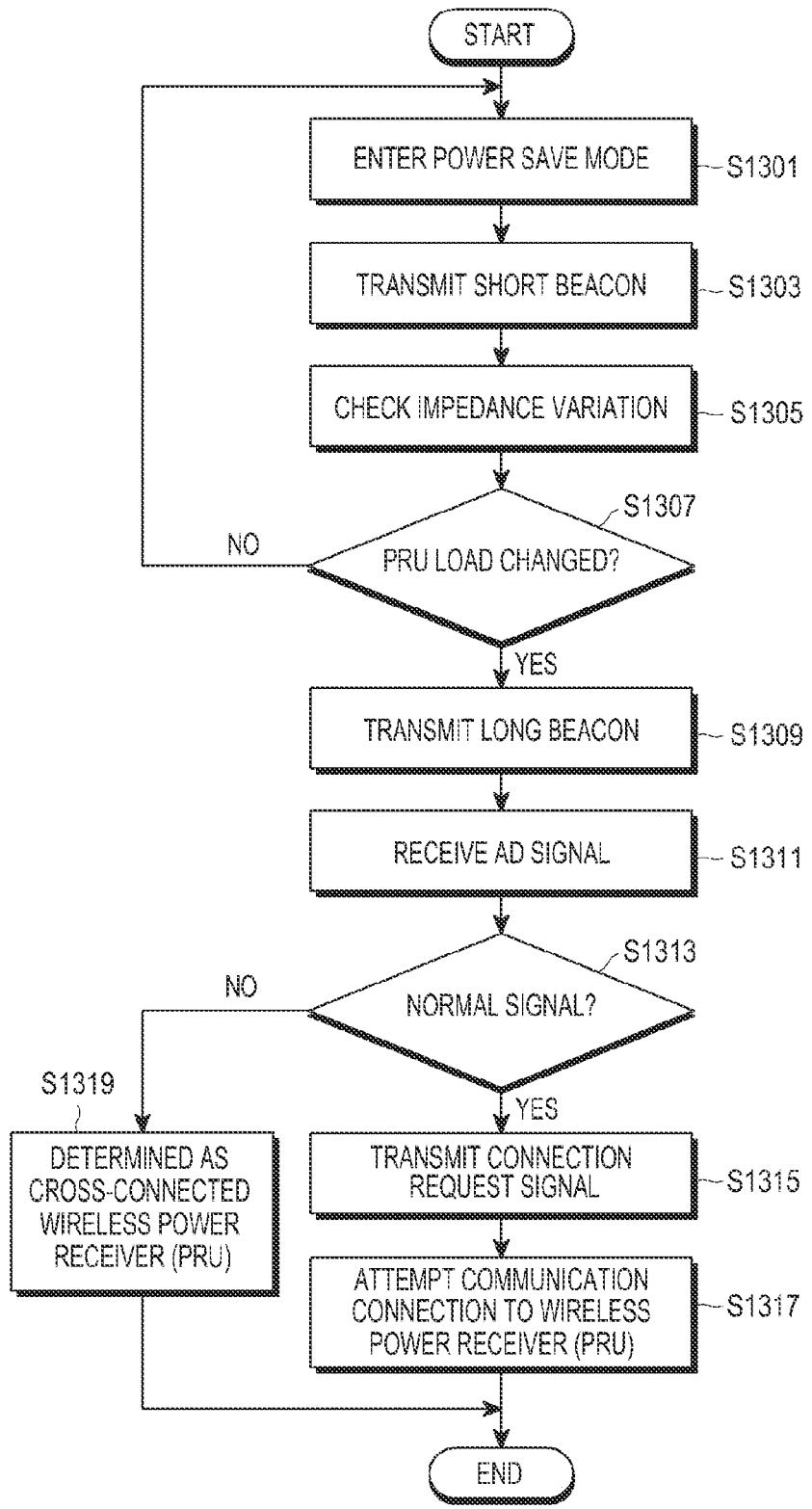
FIG. 13 is a flowchart of a method for determining cross-connection according to an embodiment of the present invention.

FIG. 13 is a flowchart of a method for determining cross connection according to an embodiment of the present invention.

Referring to FIG. 13, when a wireless power transmitter is powered on and enters the power save mode in step S1301, the wireless power transmitter transmits power of a short beacon and power of a long beacon to a wireless power receiver in step S1303.

The wireless power transmitter transmits the short beacon and checks an impedance shift in the load of the wireless power receiver via a coil of the wireless power transmitter in step S1305.

In the presence of a load variation as a result of the check in step S1307, the wireless power transmitter transmits power to the wireless power receiver by transmitting a long beacon in step S1309. The wireless power receiver drives an MCU and/or a communication unit (BLE) with the power received in the long beacon.

The operated wireless power receiver indicates to the wireless power transmitter that the wireless power receiver has received the power and woken up by transmitting an AD signal to the wireless power transmitter.

The wireless power transmitter receives the AD signal from the wireless power receiver in step S1311 and determines whether the RSSI of the AD signal is greater than or equal to a predetermined value (for example, −65 dBm). If the RSSI of the AD signal is greater than or equal to the predetermined value, the wireless power transmitter determines whether the AD signal has been received within a predetermined time (for example, 100 ms) from the moment of a load variation.

If the AD signal has been received within the predetermined time and the RSSI of the AD signal is greater than or equal to the predetermined value, the wireless power transmitter determines that the signal has been received in step S1313 and attempts a communication connection to the wireless power receiver in step S1317 by transmitting a connection request signal to the wireless power receiver in step S1315.

In contrast, if the RSSI of the AD signal is less than the predetermined value, there is no load variation, or the AD signal has been received after the predetermined time, the wireless power transmitter determines that the wireless power receiver is not a normal charging target (fir example, the wireless power receiver is cross-connected), ignoring the received AD signal in step S1319. Alternatively, according to an embodiment of the present invention, the wireless power transmitter indicates a cross connection to the wireless power receiver by a PRU control message after transmitting a connection request message to the wireless power receiver.

Figure 14:
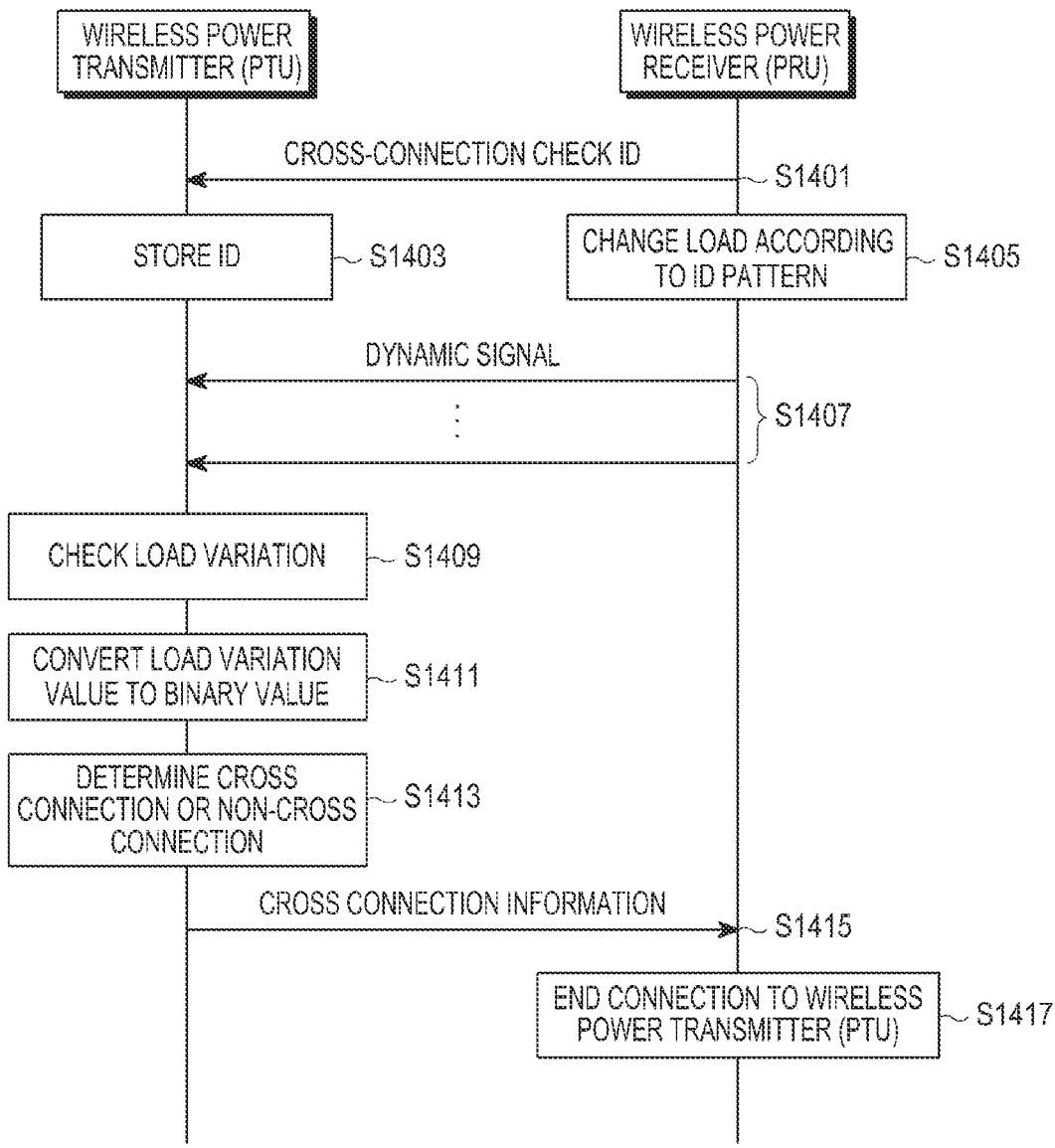
FIG. 14 is a signal flow diagram for a method for determining cross-connection according to an embodiment of the present invention.

FIG. 14 is a signal flow diagram for a method for determining cross connection according to an embodiment of the present invention.

Referring to FIG. 14, a wireless power transmitter transmits to a wireless power receiver setting information (for example, ID information) for checking cross connection of the wireless power receiver in order to determine whether the wireless power receiver has been cross-connected according to an embodiment of the present invention in step S1401. For example, if the wireless power receiver is connected to the wireless power transmitter, the wireless power receiver transmits the ID information in a PRU static parameter or a PRU dynamic parameter to the wireless power transmitter in step S1407.

According to an embodiment of the present invention, the ID may be set to a random binary value (for example, "1101") in order to check cross-charging of the wireless power receiver. The ID value may be dedicated only for the cross-connection check of the wireless power receiver.

According to an embodiment of the present invention, the wireless power receiver receives a cross connection check ID for the wireless power transmitter by a PTU static parameter or a PRU control signal.

When the ID information is shared between the wireless power transmitter and the wireless power receiver in this manner, the wireless power receiver generates the same pattern information corresponding to the ID as a load variation in step S1405 so that the wireless power transmitter may sense the load variation within a registration time or a predetermined time.

The wireless power transmitter stores the ID information received from the wireless power receiver in step S1403 and checks the load variation of the wireless power receiver in step S1409. Then, the wireless power transmitter converts the load variation to binary information in step S1411 and determines whether the wireless power receiver has been cross-connected by comparing the binary information with the stored ID information in step S1413.

The wireless power transmitter receives the ID information in the low power mode or the power transfer mode. Accordingly, upon receipt of an AD signal from the wireless power receiver, the wireless power transmitter discontinues power tracking until the check is completed according to the received ID information or for a predetermined time.

If the wireless power transmitter fails in the ID check or determines that the checked ID is different from the stored ID, the wireless power transmitter determines that the wireless power receiver is not a normal charging target (for example, the wireless power receiver is cross-connected) in step S1413 and enters the power save mode, the latch fault mode, or the local fault mode to thereby reduce power transmission. If the above situation occurs while the wireless power transmitter is charging another wireless power receiver (for example, in the power transfer mode), the wireless power transmitter reduces output power by returning to the latch fault mode or the power save mode or continues power transmission.

The wireless power transmitter indicates to the wireless power receiver whether the wireless power receiver is cross-connected by transmitting a PRU control signal including a data field indicating cross connection or non-cross connection illustrated in Table 8 below until before the connection to the wireless power receiver is released in step S1415.

Figure 15:
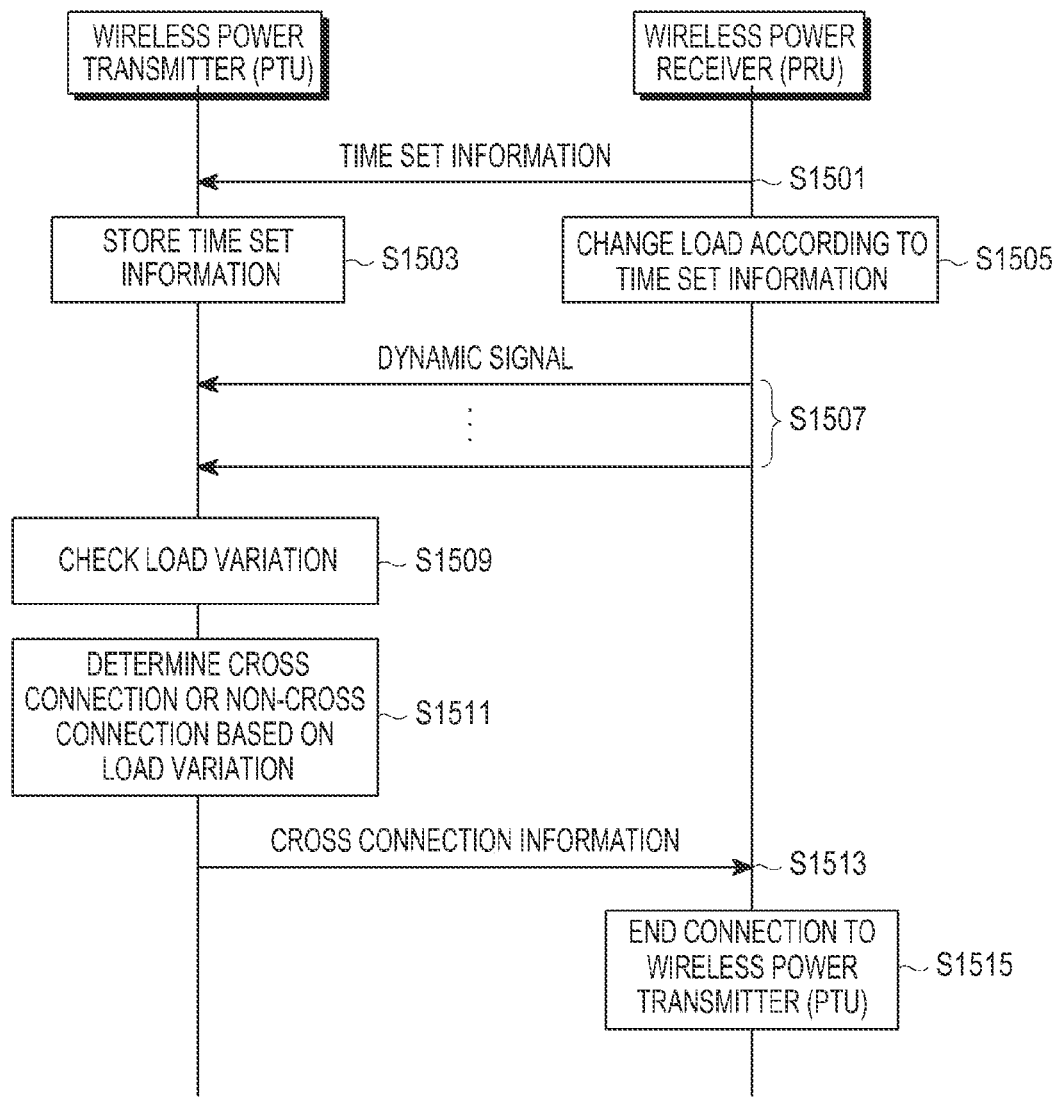
FIG. 15 is a signal flow diagram of a method for determining cross-connection according to an embodiment of the present invention.

FIG. 15 is a signal flow diagram of a method for determining cross connection according to an embodiment of the present invention.

Referring to FIG. 15, a wireless power receiver transmits time set information for a cross-connection check of the wireless power receiver to a wireless power transmitter so that the wireless power transmitter may determine whether the wireless power receiver is cross-connected in step S1501. For example, when the wireless power receiver is connected to the wireless power transmitter, the wireless power receiver transmits the time set information to the wireless power transmitter in a PRU static parameter or a PRU dynamic parameter in step S1507.

The time set information is time information by which the wireless power receiver makes a load variation, and may be dedicated to the cross-connection check of the wireless power receiver.

According to an embodiment of the present invention, the wireless power receiver receives time set information for the wireless power transmitter, for a cross-connection check by a PTU static parameter or a PRU control signal.

When the time set information is shared between the wireless power transmitter and the wireless power receiver in this manner, the wireless power receiver may cause a load variation in the same pattern according to the time set information in step S1505. The load variation is generated within a registration time (for example, 50 ms) or a predetermined time.

The wireless power transmitter stores the time set information received from the wireless power receiver in step S1503 and checks the load variation of the wireless power receiver in step S1509. Then, the wireless power transmitter determines whether the wireless power receiver has been cross-connected by comparing a duration of the load variation with the received time set information in step S1511.

The wireless power transmitter receives the time set information in the low power mode or the power transfer mode. Accordingly, upon receipt of an AD signal from the wireless power receiver, the wireless power transmitter discontinues power tracking until the check is completed according to the received time set information or for a predetermined time.

If the load variation does not match the time set information, the wireless power transmitter determines that the wireless power receiver is not a normal charging target (for example, the wireless power receiver is cross-connected) in step S1513 and enters the power save mode, the latch fault mode, or the local fault mode to thereby reduce power transmission. If the above situation occurs while the wireless power transmitter is charging another wireless power

TABLE 8

| 7 | 6 | 5 | 4 | 3 | 2 | 1 | 0 |
|---|---|---|---|---|---|---|---|
| Enable PRU output | Enable PRU charge indicator | Adjust power comand | | Cross connected | RFU | RFU | RFU |
| 1 = Enable | 1 = Enable | 00 = Maximum power | | 1 = Yes | RFU | RFU | RFU |
| 0 = Disable | 0 = disable | 01 = 66% * $P_{RECT\_MAX}$ | | 0 = No | | | |
| | | 10 = 33% * $P_{RECT\_MAX}$ | | | | | |
| | | 11 = 2.5% | | | | | |

Upon receipt of the cross-connection message, the wireless power receiver ends the connection to the wireless power transmitter in step S1417 and may attempt a connection to another wireless power transmitter from which it is receiving power.

receiver (for example, in the power transfer mode), the wireless power transmitter reduces output power or continues power transmission by returning to the latch fault mode or the power save mode.

The wireless power transmitter indicates to the wireless power receiver whether the wireless power receiver is cross-connected by transmitting a PRU control signal including a data field indicating cross connection or non-cross connection illustrated in Table 8 below until before the connection to the wireless power receiver is released in step S1513.

Upon receipt of the cross-connection message, the wireless power receiver ends the connection to the wireless power transmitter in step S1515 and attempts a connection to another wireless power transmitter from which it is receiving power.

Figure 16:
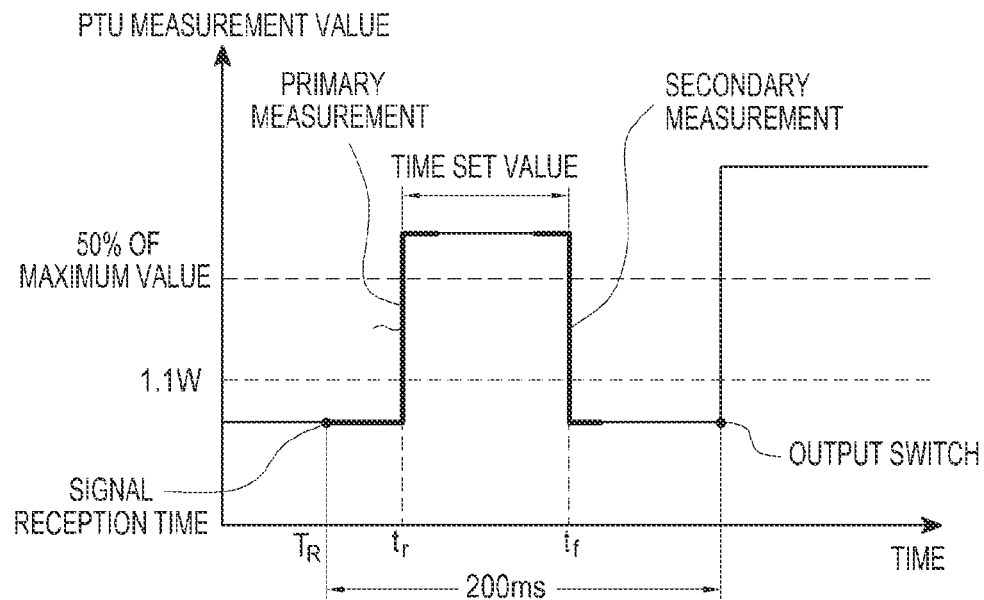
FIG. 16 is a graph illustrating a measurement of a time set value according to an embodiment of the present invention.

FIG. 16 is a graph illustrating a measurement of a time set value according to an embodiment of the present invention.

Referring to FIG. 16, a wireless power transmitter determines whether a wireless power receiver is cross-charged by checking a load variation of the wireless power receiver. After transmitting, for example, a PRU control signal or a PTU static signal to the wireless power receiver, the wireless power transmitter measures the load of the wireless power receiver after a time $T_R$ of receiving an ACKnowledgement (ACK) signal from the wireless power receiver.

The signal measurement may be performed periodically within a maximum time (for example, 200 ms) which has been set. For example, a primary measurement may be performed at a rising time $t_r$ of a measurement value within the time set value and a secondary measurement may be performed at a falling time $t_r$ of a measurement value within the time set value.

Figure 17:
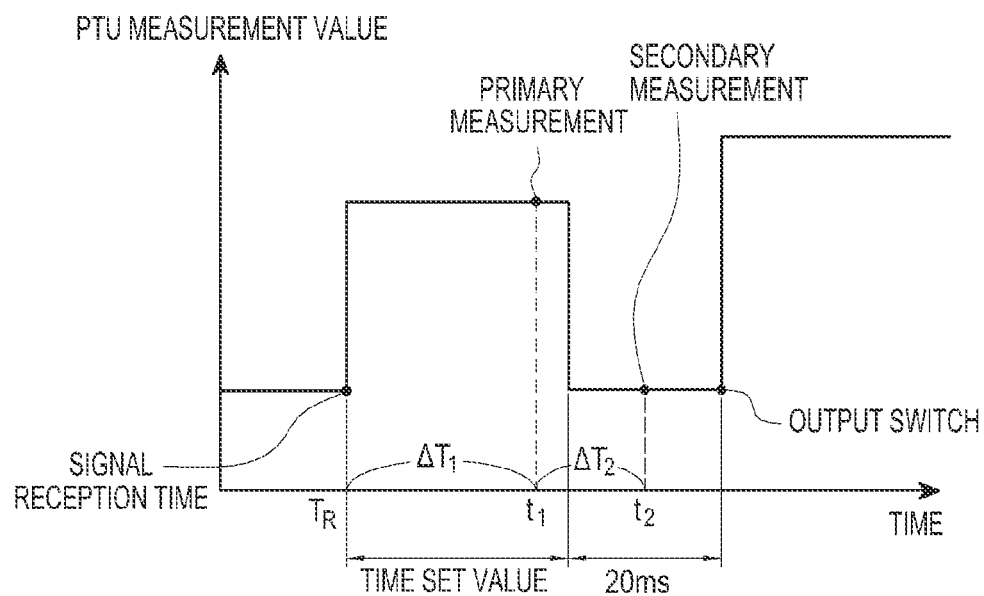
FIG. 17 is a graph illustrating a measurement of a time set value according to another embodiment of the present invention.

FIG. 17 is a graph illustrating a measure of a time set value according to an embodiment of the present invention.

Referring to FIG. 17, a wireless power transmitter determines whether a wireless power receiver is cross-charged by checking a load variation of the wireless power receiver as described above with reference to FIG. 15. After transmitting, for example, a PRU control signal or a PTU static signal to the wireless power receiver, the wireless power transmitter measures the load of the wireless power receiver after a time $T_R$ of receiving an ACK signal from the wireless power receiver.

A primary measurement is performed at a predetermined first time $\Delta T_1$ after receiving the signal within a maximum time (for example, 200 ms) which has been set. Then, a secondary measurement is performed a predetermined second time $\Delta T_2$ later. In this manner, a measurement is performed only at a time set by the wireless power transmitter, not repeatedly. Therefore, the performance of the wireless power transmitter is increased.

As is apparent from the foregoing description, a problem encountered when a wireless power transmitter is connected to a wireless power receiver placed on another wireless power transmitter and charges the wireless power receiver can be overcome according to various embodiments of the present invention.

While the present invention has been shown and described with reference to certain embodiments thereof, it will be understood by those skilled in the art that various changes in form and details may be made therein without departing from the scope and spirit of the present invention, as defined by the appended claims and their equivalents.

What is claimed is:

1. A control method of a wireless power receiver for receiving charging power from a wireless power transmitter, the method comprising:
   transmitting setting information to the wireless power transmitter;
   generating a load variation based on a pattern included in the setting information within a predetermined time;
   receiving a message including a bit field indicating a cross-connection from the wireless power transmitter; and
   terminating a connection to the wireless power transmitter based on the message.

2. The method of claim 1, wherein the setting information includes binary data.

3. The method of claim 1, wherein the setting information is randomly generated information.

4. The method of claim 1, wherein the setting information includes a plurality of bits.

5. A control method of a wireless power transmitter, the method comprising:
   receiving setting information from a wireless power receiver;
   detecting a load variation;
   comparing the load variation to a pattern included in the setting information; and
   transmitting a message including a bit field indicating a cross-connection.

6. The method of claim 5, wherein the setting information includes binary data.

7. The method of claim 5, wherein the setting information is randomly generated information.

8. The method of claim 5, wherein the setting information includes a plurality of bits.

* * * * *